(12) United States Patent
Yajima

(10) Patent No.: US 6,404,550 B1
(45) Date of Patent: Jun. 11, 2002

(54) OPTICAL ELEMENT SUITABLE FOR PROJECTION DISPLAY APPARATUS

(75) Inventor: Akitaka Yajima, Suwa (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 08/888,504

(22) Filed: Jul. 7, 1997

(30) Foreign Application Priority Data

| Jul. 25, 1996 | (JP) | 8-215377 |
| Jul. 25, 1996 | (JP) | 8-215378 |
| Dec. 19, 1996 | (JP) | 8-355210 |

(51) Int. Cl.$^7$ .................. G02B 5/30; G02B 27/28
(52) U.S. Cl. ................. 359/487; 359/495; 359/497; 359/622; 359/627
(58) Field of Search .............. 359/487, 488, 359/495, 496, 497, 498, 622, 627; 156/99

(56) References Cited

U.S. PATENT DOCUMENTS

| 2,748,659 A | | 6/1956 | Geffcken et al. ............. 88/65 |
| 3,743,380 A | * | 7/1973 | Fugitt ......................... 359/495 |
| 3,876,285 A | * | 4/1975 | Schwarmuller ............ 359/495 |
| 5,096,520 A | | 3/1992 | Faris .......................... 156/99 |
| 5,157,526 A | * | 10/1992 | Kondo et al. ............... 359/487 |
| 5,381,278 A | * | 1/1995 | Shingaki et al. ............ 359/497 |
| 5,555,186 A | | 9/1996 | Shioya |
| 5,566,367 A | * | 10/1996 | Mitsutake et al. .......... 359/495 |
| 5,650,873 A | * | 7/1997 | Gal et al. .................... 359/487 |

FOREIGN PATENT DOCUMENTS

| DE | 935 663 | | 1/1956 | |
| EP | 0 359 658 | | 3/1990 | |
| EP | 0 508 413 A2 | | 10/1992 | |
| GB | 2 153 546 | | 8/1985 | |
| JP | 405066303 | * | 3/1993 | ................ 359/496 |
| JP | 06082623 | | 3/1994 | |
| JP | 7-43508 | | 2/1995 | |
| JP | 7-294906 | | 11/1995 | |

* cited by examiner

*Primary Examiner*—Ricky D. Shafer
(74) *Attorney, Agent, or Firm*—Beyer Weaver & Thomas, LLP

(57) ABSTRACT

Platelike first transparent members 321 and platelike second transparent members 322 are prepared. Each first transparent member has substantially parallel first and second surfaces (film forming surfaces). A polarization splitting film 331 is formed on the first film forming surface. A reflecting film 332 is formed on the second film forming surface. The films are not formed on the surfaces of the second transparent members 322. A plurality of the first transparent members 321 and a plurality of the second transparent members 322 are adhered alternately. A block is cut from the so-adhered transparent members at a prescribed angle to the surfaces and the cut surfaces thereof are polished to obtain a polarization beam splitter array 320.

12 Claims, 19 Drawing Sheets

EMBODIMENT

Fig. 2(A) PREPARATION OF PLATELIKE MEMBERS
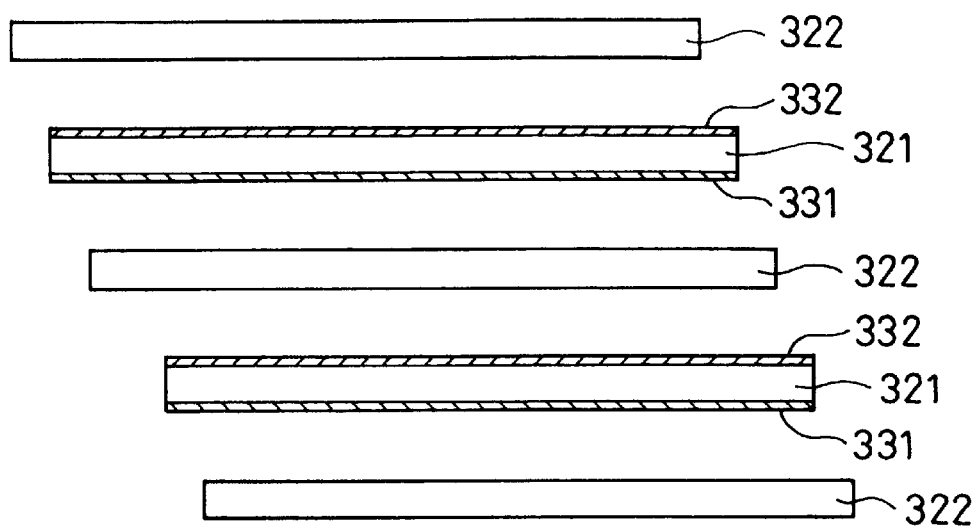
Fig. 2(B) PASTING
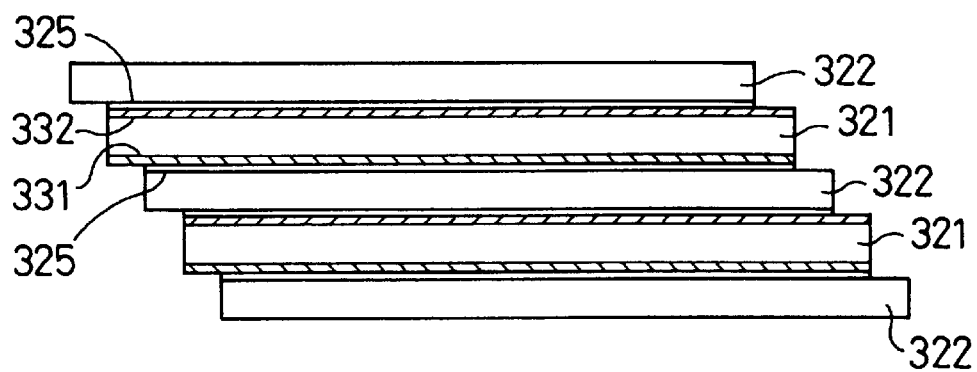

Fig. 3(A) CURING OF OPTICAL ADHESIVE
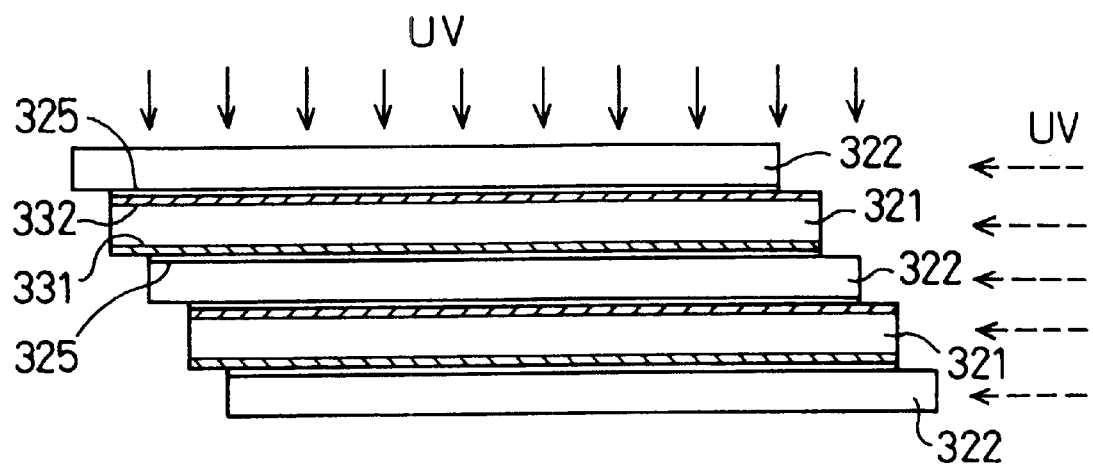
Fig. 3(B) CUTTING OUT
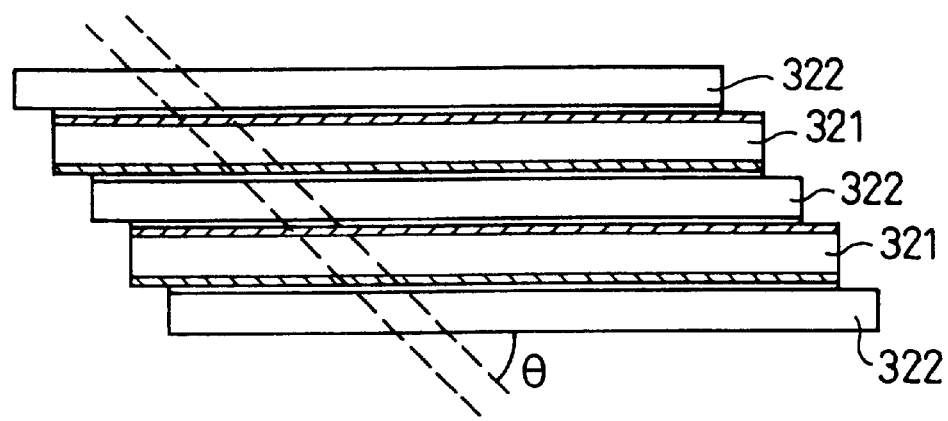

Fig. 5(A) EMBODIMENT      Fig. 5(B) CONTROL EXAMPLE
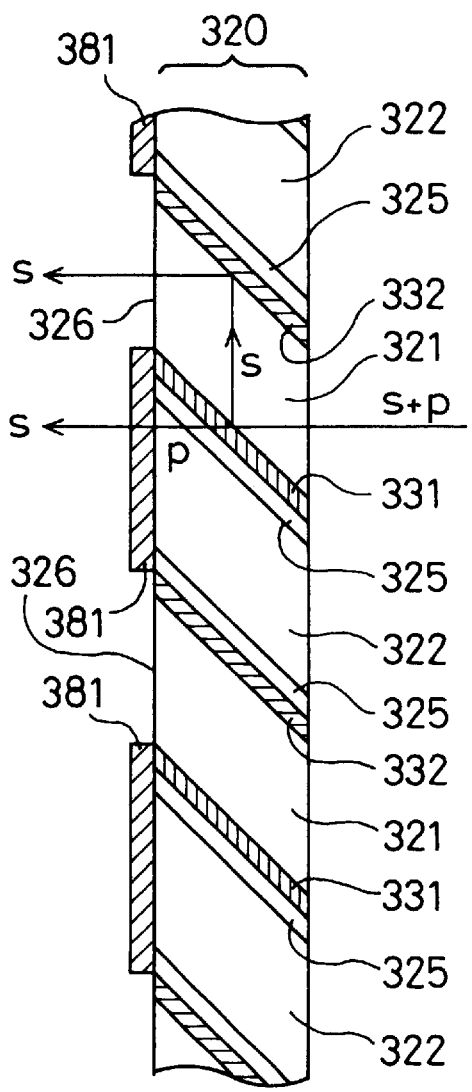
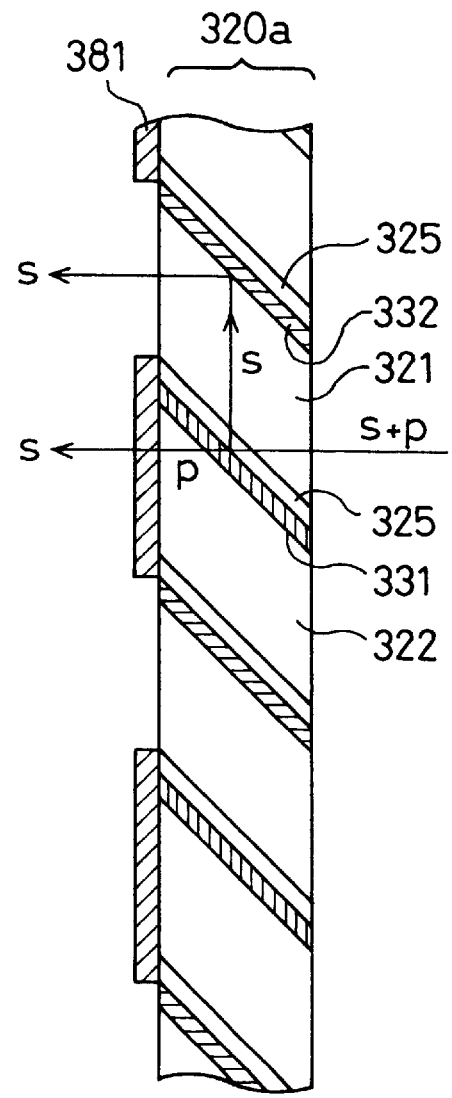

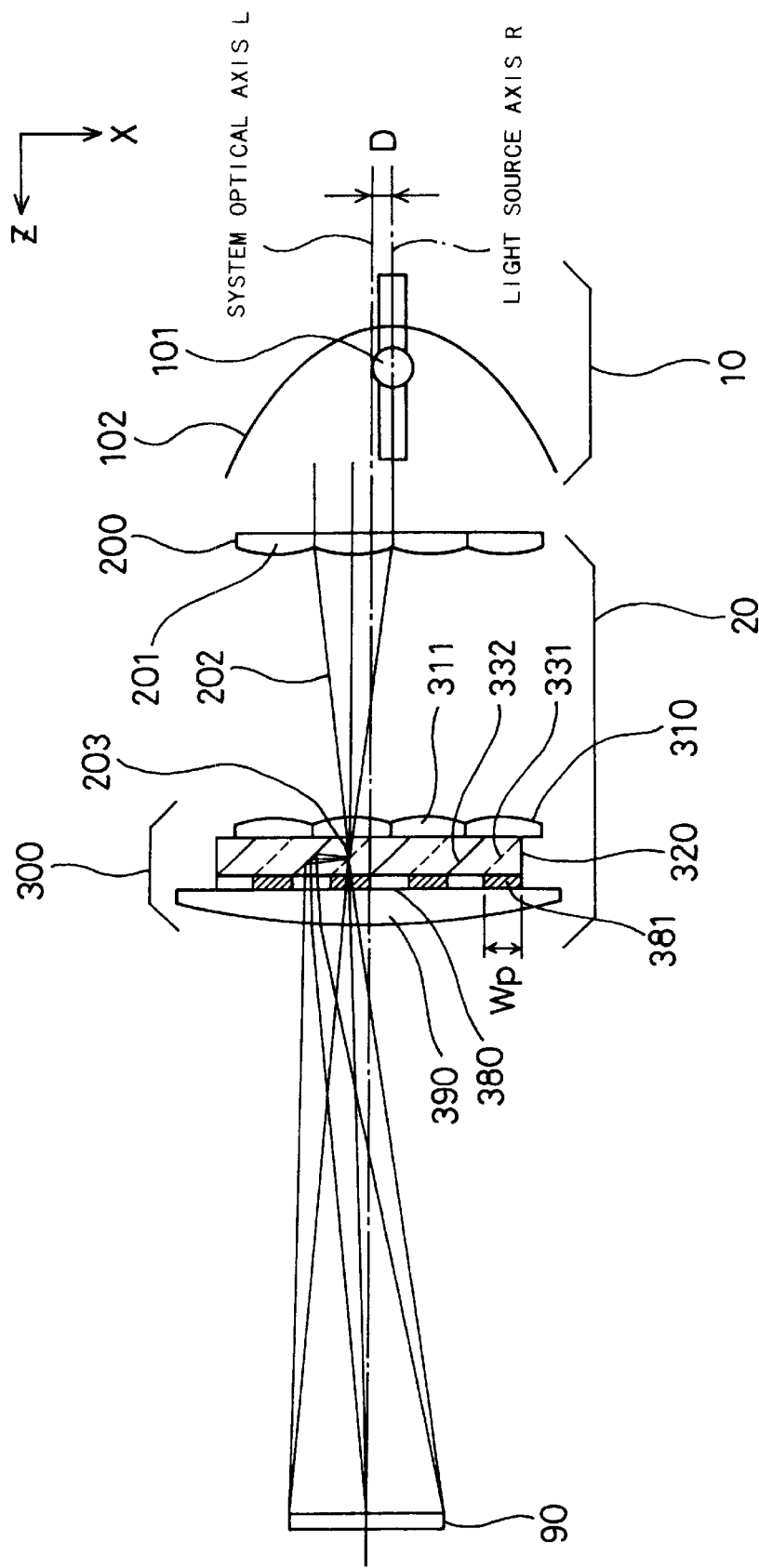
Fig. 6 POLARIZED LIGHT ILLUMINATION SYSTEM 1

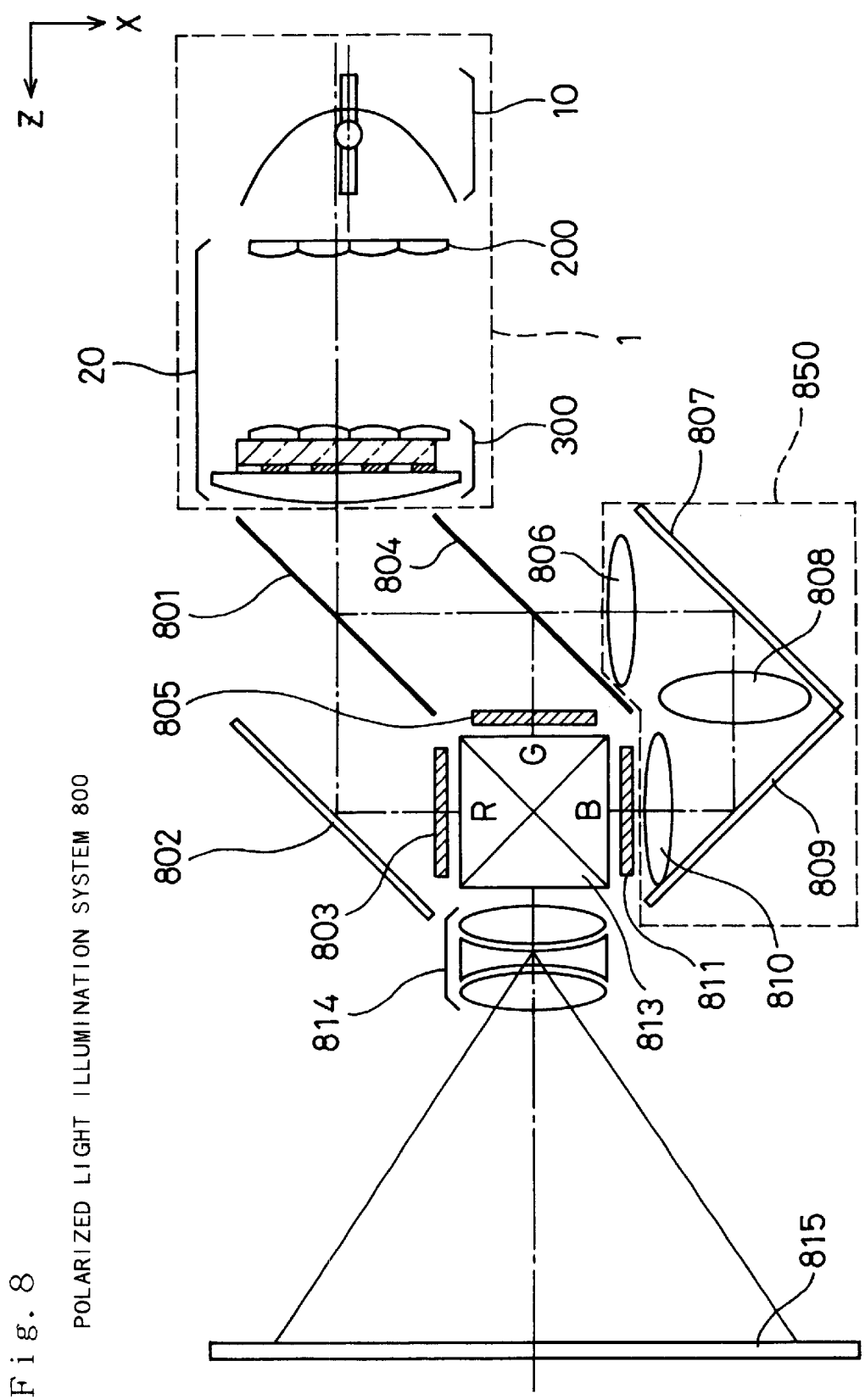
Fig. 8  POLARIZED LIGHT ILLUMINATION SYSTEM 800

$$t_{ad1} = t_{ad2} = t_{ad}$$
$$t_{322} \doteqdot t_{321} - 2t_{ad}$$
$$L_{322} \doteqdot L_{321} - 2L_{ad}$$

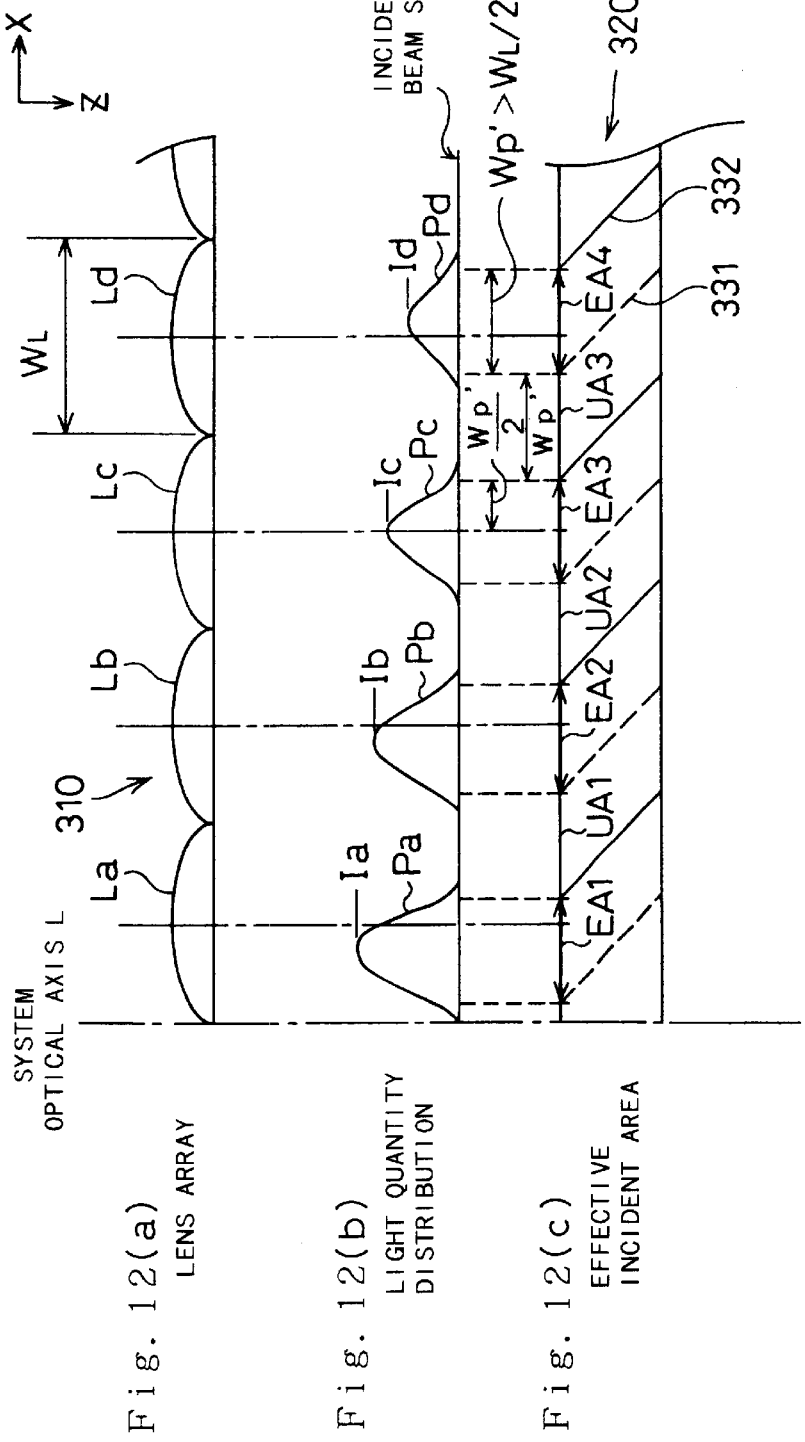

OPTICAL ELEMENT SUITABLE FOR PROJECTION DISPLAY APPARATUS

BACKGROUND OF THE INVENTION

1. Field of the Invention

The present invention relates to an optical element suitable for a projection display apparatus, and a method for fabricating the optical element.

2. Description of the Related Art

Japanese Patent Laid-open Gazette No. 7-294906 discloses an optical element, called polarization converting element, for use in converting light having random polarization directions to light having one polarization direction. Such an optical element is shown in plan view in FIG. 1(A) and in perspective view in FIG. 1(B). This optical element comprises a polarization beam splitter array 22 comprising alternately adhered linear polarization beam splitters 30 having polarization splitting films 36 and linear prisms 40 having reflecting films 46. Portions of the exit surface of the polarization beam splitter array 22 are selectively provided with $\lambda/2$ optical phase plates 24.

The linear polarization beam splitter 30 includes two rectangular prisms 32, 34 and the polarization splitting film 36 formed at the slant plane constituted by the interface between the rectangular prisms 32, 34. During fabrication of the polarization beam splitter 30, the polarization splitting film 36 is formed on the slant plane of one of the rectangular prisms and the two rectangular prisms 32, 34 are then bonded with an optical adhesive.

The linear prism 40 includes two rectangular prisms 42, 44 and the reflecting film 46 formed at the slant plane at the interface between rectangular prisms 42, 44. During fabrication of the prism 40, the reflecting film 46 is formed on the slant plane of one of the rectangular prisms, and the two rectangular prisms 42, 44 are then bonded with an optical adhesive. The reflecting film 46 is formed of an aluminum or other metal film.

Multiple linear polarization beam splitters 30 and linear prisms 40 prepared in this manner are adhered alternately with an optical adhesive to fabricate the polarization beam splitter array 22. The $\lambda/2$ optical phase plates 24 are then selectively bonded to the exit surface of the linear polarization beam splitter 30.

Light including an S polarized light component and a P polarized light component enters from the incident surface. The incident light is first separated into S polarized light and P polarized light by the polarization splitting film 36. The S polarized light is reflected at substantially a right angle by the polarization splitting film 36, is further reflected at a right angle by the reflecting film 46, and exits the prism 40. The P polarized light passes straight through the polarization splitting film 36, is converted to S polarized light by the $\lambda/2$ optical phase plate 24, and exits therefrom. As a result, a light beam having random polarization directions entering this optical element emerges entirely as an S polarized light beam.

The conventional optical element shown in FIGS. 1(A) and 1(B) has four rectangular prisms 32, 34, 42, 44 adhered by optical adhesive. Between entering and exiting the optical element, the S polarized light and P polarized light must therefore pass repeatedly through the optical adhesive layers formed at the prism interfaces. Since the optical adhesive absorbs some of the light, the intensity of the light decreases with each passage through an optical adhesive layer. This results in a considerable decline in light utilization efficiency.

SUMMARY OF THE INVENTION

Accordingly, an object of the present invention is to enhance the light utilization efficiency of the optical element.

Another object of the present invention is to provide the optical element which is easy to fabricate.

In order to attain at least part of the above and other objects, the present invention provides an optical element comprising a plurality of first transparent members and a plurality of second transparent members, which are alternately arranged with and secured to each other. Each of the plurality of first transparent members has a first incident surface and a first exit surface substantially parallel to each other, first and second film forming surfaces substantially parallel to each other and making a prescribed angle with the first incident surface and the first exit surface. A polarization splitting film is formed on the first film forming surface, and a reflecting film is formed on the second film forming surface. Each of the plurality of second transparent members has a second incident surface and a second exit surface parallel to each other. The plurality of second transparent members are alternately arranged with and secured to the plurality of first transparent members at the first and second film forming surfaces across the polarization splitting film and the reflecting film respectively so that the second incident surfaces are aligned with the first incident surfaces to form an incident plane and that the second exit surfaces are aligned with the first exit surfaces to form an exit plane.

In the above optical element, after the light enters through the incident surface of the first transparent member, the polarized light component thereof reflected by the polarizing-splitting film is reflected by the reflecting film without passing through a layer of optical adhesive and then exits from the optical element. The light utilization efficiency is improved because the number of times this polarized light component passes through layers of the optical adhesive can therefore be reduced.

In a preferred embodiment, the reflecting film has a dielectric multi-layer film. A reflecting film formed of a multi-layer dielectric films enables the reflectance for a specific linearly polarized light component to be increased over that in the case of a reflecting film formed of an aluminum or other metal film. A further increase in the light utilization efficiency can therefore be attained.

In the embodiment, the optical element further comprises polarization direction converting means associated with either of the first exit surface and the second exit surface. Linearly polarized light components of different polarization direction exit from the exit surface portion of the first transparent member and the exit surface portion of the second transparent member. Thus, by providing a polarization direction converting means on one of the exit surface portions, the light beam exiting from the optical element can be entirely converted to one linearly polarized light component.

The optical element may further comprise light shielding means associated with the second incident surface. If light enters from the second incident surface of the second transparent member, this light will, after reflection by the reflecting film, pass through optical adhesive layers repeatedly before being converted into S polarized light and P polarized light by the polarization splitting film. If this kind of light is shut out by providing light shielding means with respect to the second incident surface of the second transparent member, repeated passage of the light entering the optical element through optical adhesive layers can be prevented.

The optical element further comprises adhesive layers between the first and second transparent members, and at least one of a thickness of the adhesive layers and thicknesses of the first and second transparent members are adjusted to make intervals between the polarization splitting films and the reflecting films substantially constant throughout the optical element. Since this makes the intervals between the polarization splitting films and the reflecting films equal, the positional accuracy of the films in the optical element can be improved to increase the light utilization efficiency.

Preferably, the thickness of the second transparent members is set smaller than the thickness of the first transparent member. More preferably, the thickness of the second transparent member is in the range of 80% to 90% of the thickness of the first transparent member. For example, the thickness of the first transparent members is equal to a value obtained by adding twice the thickness of the adhesive layers to the thickness of the second transparent members.

The optical element may be used with a plurality of small lenses which will be arranged on the incident plane, and the intervals between the plurality of polarization splitting films may substantially correspond to a pitch of the plurality of small lenses. This makes the intervals between the polarization splitting films and the reflecting films constant, thereby increasing the light utilization efficiency of the optical element.

In another embodiment, at least one of a thickness of the adhesive layers and thicknesses of the first and second transparent members are adjusted to make the intervals between the plurality of polarization splitting films substantially correspond to a pitch of an optical axes of the plurality of small lenses. Since this provides a configuration enabling each of multiple light beams exiting from multiple small lenses to fall incident on a polarization splitting film associated therewith, it improves the light utilization efficiency.

In a further embodiment, the plurality of small lenses have a plurality of different optical axis pitches, and at least one of the thickness of the adhesive layers and the thicknesses of the first and second transparent members are adjusted to make the intervals between the plurality of polarization splitting films substantially correspond to the plurality of different optical axis pitches. This provides a configuration which, even when the pitch of the lens optical axes varies, enables each of the beams exiting from the small lenses to fall incident on a polarization splitting film associated therewith. It therefore improves the light utilization efficiency.

The optical element can be used with a plurality of small lenses which will be arranged on the incident plane. In this case, intervals between the plurality of polarization splitting films may substantially correspond to a pitch of a plurality of light beams exiting from the plurality of small lenses. The pitch of the light beams exiting from the small lenses does not always coincide with the pitch of the lens optical axes. This configuration enables each light beam exiting from the small lenses to fall incident on the associated polarization splitting film even in such a case. It thus improves the light utilization efficiency.

At least one of the thickness of the adhesive layers and the thicknesses of the first and second transparent members may be adjusted to make the intervals between the plurality of polarization splitting films substantially correspond to the pitch of the plurality of light beams exiting from the plurality of small lenses.

According to an aspect of the present invention, there is provided a method for fabricating an optical element. The method comprises the steps of: (a) providing a plurality of first transparent members each having substantially parallel first and second surfaces, and a plurality of second transparent members each having two substantially parallel surfaces; (b) forming a polarization splitting film on the first surface of each the first transparent member; (c) forming a reflecting film on the second surface of each the first transparent member; (d) alternately arranging the plurality of first transparent members each having the polarization splitting film and the reflecting film and the plurality of the second transparent members, and adhering the plurality of first transparent members to the plurality of the second transparent members; and (e) cutting the alternately adhered transparent members at a prescribed angle to the first and second surfaces to produce an optical element block having an incident plane and an exit plane which are substantially parallel to each other.

The method may further comprises the step of (f) polishing the incident plane and the exit plane of the optical element block.

In a preferred embodiment, the step (d) comprises the steps of: alternately stacking the plurality of first transparent members and the plurality of second transparent members with layers of photo-curing adhesive therebetween; and adhering the stacked first and second transparent members through exposure of light. Since this enables the optical adhesive to be cured by irradiating the adhered transparent members with light, it facilitates the fabrication of the optical element.

The step (d) may comprise the steps of: (1) forming a stack by stacking one of the plurality of first transparent members and one of the plurality of second transparent members with a layer of photo-curing adhesive therebetween; (2) curing the photo-curing adhesive layer by irradiating the stack with light; and (3) alternately stacking one of the plurality of first transparent members and one of the plurality of second transparent members on the stack with layers of the photo-curing adhesive therebetween, respectively, while curing the individual photo-curing adhesive layers by irradiating the stack with light each time one transparent member is added. Since this enables the adhesive to be cured after each transparent member is stacked, it makes it possible to establish the positional relationship among the transparent members with good accuracy.

In another embodiment, the step (d) comprises the steps of: (1) forming a stack by stacking one of the plurality of first transparent members and one of the plurality of second transparent members with a layer of photo-curing adhesive therebetween, (2) curing the photo-curing adhesive layer by irradiating the stack with light to produce a unit stack, and (3) stacking a plurality of unit stacks obtained by the steps (1) and (2) with layers of the photo-curing adhesive therebetween, respectively, while curing the individual photo-curing adhesive layers by irradiating a stack of the unit stacks with light each time one unit stack is added. Since this method also enables the adhesive to be cured after each transparent member is stacked, it makes it possible to establish the positional relationship between adjacent transparent member members with good accuracy.

Preferably, the irradiation is conducted in a direction not parallel to the surfaces of the transparent members. Since this enables the adhesive to be efficiently irradiated by the light, it reduces the adhesive curing time and improves the optical element production throughput.

According to another aspect, the present invention provides an projection display apparatus comprising the above stated optical element; polarization converting means for converting light exiting from the optical element to one type of polarized light; modulating means for modulating the light exiting the polarization converting means as a function of a given image signal; and a projection optical system for projecting the light modulated by the modulating means on a screen. The use of the optical element with high light utilization efficiency ensures projection of a bright image on the projections surface.

According to still another aspect of the present invention, an optical element comprises: a plurality of polarization splitting members, each comprising: a light incident surface; a light exit surface substantially parallel to the light incident surface; a polarization splitting film formed at a prescribed angle with the light incident surface and the light exit surface; and a reflecting film substantially parallel to the polarization splitting film. The plurality of polarization splitting members are arranged in a form of a matrix, and the polarization splitting film and the reflecting film are a dielectric multi-layer film. The light for curing the photocuring adhesive passes through the dielectric multi-layer film. Accordingly, the light for curing the adhesive can irradiate the adhesive layer through the polarization splitting film and the reflecting film of a dielectric multi-layer film structure, and this simplifies the fabrication process of the optical element. Further, the reflecting film of a dielectric multi-layer structure can be designed to have higher reflectance of a specific linear polarized light component. This further enhances the light utilization efficiency.

In a preferred embodiment, the light exit surface includes a first exit surface portion and a second exit surface portion. The first exit surface portion emits selected one of S-polarized light and P-polarized light which has passed through the polarization splitting film, while the second exit surface portion emits the other one of the S-polarized light and P-polarized light which has been reflected by the polarization splitting film and the reflecting film. The optical element further comprises a λ/2 phase plate associated with selected one of the first and second exit surface portions. Accordingly, only one linearly polarized light will be emitted from the optical element.

According to another aspect, the present invention provides a projection display apparatus comprising: a light source for generating luminous flux including S-polarized light and P-polarized light; an optical element for receiving the luminous flux from the light source and emitting the luminous flux as selected one of S-polarized light and P-polarized light; modulating means for modulating the light exiting the optical element as a function of a given image signal; and a projection optical system for projecting the light modulated by the modulating means on a screen.

These and other objects, features, aspects, and advantages of the present invention will become more apparent from the following detailed description of the preferred embodiments with the accompanying drawings.

BRIEF DESCRIPTION OF THE DRAWINGS

FIGS. 2(A) and 2(B) are sectional views illustrating the main processing steps in the fabrication of a polarization beam splitter array which is an embodiment of the invention;

FIGS. 3(A) and 3(B) are sectional views illustrating the main processing steps in the fabrication of a polarization beam splitter array which is an embodiment of the invention;

FIGS. 5(A) and 5(B) are plan sectional views comparing polarization converting elements according to an embodiment of the invention and a control example;

FIG. 6 is schematic structural plan view of the essential portion of a polarized light illumination system including a polarization beam splitter array which is an embodiment of this invention;

FIG. 8 is a schematic structural view showing the essential portion of a projection display system 800 provided with a polarized light illumination system 1;

FIGS. 12(a)–12(c) are explanatory diagrams showing the case where the pitch of polarization splitting films 331 is set to a different value from the pitch of the centers 311c of condensers lenses 311;

DESCRIPTION OF THE PREFERRED EMBODIMENT

A. First embodiment

Figure 1A:
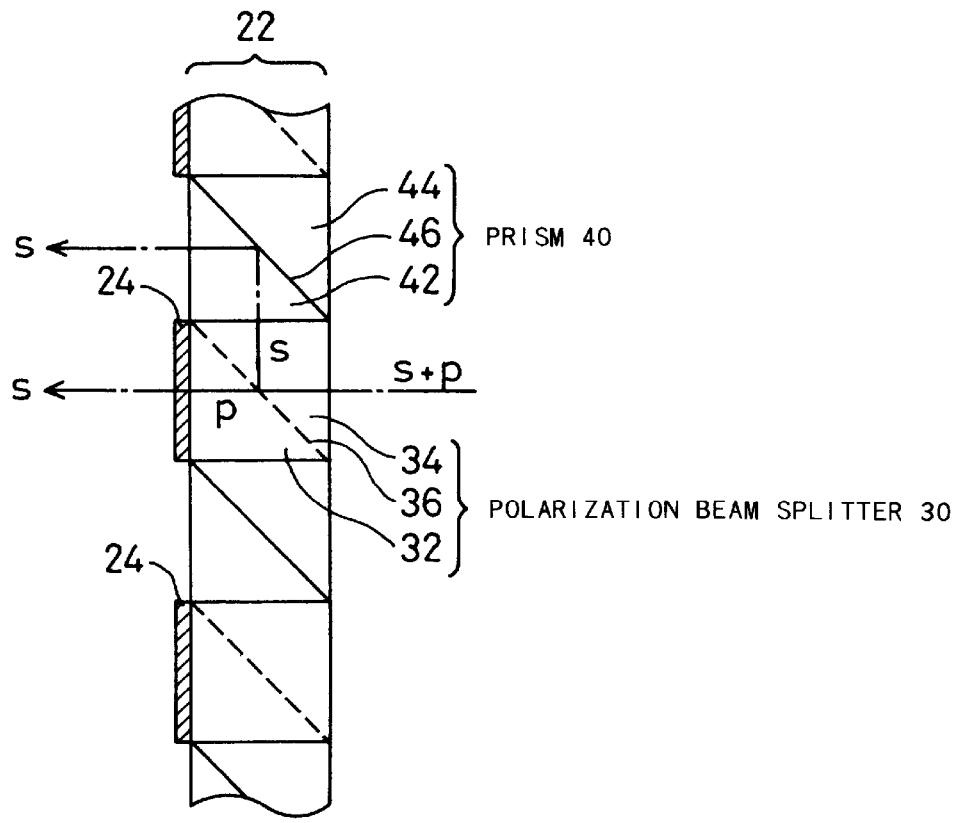
FIGS. 1(A) and 1(B) are diagrams showing the general structure of a polarization converting element.

FIGS. 2(A), 2(B), 3(A), and 3(B) are sectional views illustrating the main processing steps in the fabrication of a polarization beam splitter array which is a first embodiment of the invention.

In the step of FIG. 2(A), a plurality of platelike first transparent members 321 and a plurality of platelike second transparent members 322 are prepared. A polarization splitting film 331 is formed on one of the two parallel main surfaces (film forming surfaces) of each first transparent member 321, and reflecting film 332 is formed on the other surface. Neither surface of the second transparent members 322 is provided with a film.

Plate glass is used for the first and second transparent members 321, 322, but other transparent platelike materials than glass are also usable. Moreover, the materials of the first and second transparent members can be different in color from each other. Use of different colored materials is advantageous from the point of making it easy to distinguish the two members after completion of the polarization beam splitter array. For instance, one member can be formed of colorless plate glass and the other of blue transparent glass. The plate glass is preferably polished plate glass or float glass, most preferably polished plate glass.

The polarization splitting film 331 selectively transmits one linearly polarized light, either S polarized light or P polarized light, while reflecting the other. The polarization splitting film 331 is ordinarily prepared by forming a multi-layer dielectric film stack having this property.

The reflecting film 332 is also prepared by forming a multi-layer dielectric film stack. The multi-layer dielectric film stack constituting the reflecting film 332 is different in composition and structure from that constituting the polarization splitting film 331. The reflecting film 332 is preferably made of a multi-layer dielectric film stack which selectively reflects only the linearly polarized light component reflected by the polarization splitting film 331 (S polarized light or P polarized light) and does not reflect the other linearly polarized light component.

The reflecting film 332 can be formed by vapor deposition of aluminum. When the reflecting film 332 is formed as a multi-layer dielectric film stack, it can reflect a specific linearly polarized light component (e.g., S polarized light) at a reflectance of about 98%, whereas the reflectance is about 92% at most for aluminum film. The amount of light obtained from the polarization beam splitter array can therefore be increased by forming the reflecting film 332 as a multi-layer dielectric film stack. Since a multi-layer dielectric film stack absorbs less light than an aluminum film, it is also advantageous from the point of lower heat generation. The reflectance for the specific linearly polarized light component can be improved by optimizing the thickness and material of each film of the multilayer dielectric film stack (ordinarily formed by alternately laminating two types of film) constituting the reflecting film 332.

In the step of FIG. 2(B), the first and second transparent members 321, 322 are alternately adhered using an optical adhesive. This results in formation of optical adhesive layers 325 between the polarization splitting film 331 and the second transparent members 322 and between the reflecting films 332 and the second transparent members 322. The thicknesses of the layers 331, 332 and 335 are exaggerated in FIGS. 2 and 3 for convenience of illustration. The number of glass plates shown is less than actual.

In the step of FIG. 3(A), ultraviolet rays are projected substantially perpendicular to the surfaces of the adhered transparent members 321, 322 to cure the optical adhesive layer 325. The ultraviolet rays pass through the multi-layer dielectric film stacks. In this embodiment, both the polarization splitting films 331 and the reflecting films 332 are formed as multi-layer dielectric film stacks. As shown in FIG. 3(A), therefore, the plurality of optical adhesive layers 325 can be simultaneously cured by projecting ultraviolet rays in a direction substantially perpendicular to the surfaces of the transparent members 321, 322.

When the reflecting films 332 are formed by deposition of aluminum, the ultraviolet rays are reflected by the aluminum films. In this case, therefore, as shown by the broken lines in FIG. 3(A), the ultraviolet rays are projected in a direction substantially parallel to the surfaces of the transparent members 321, 322. In this case, the efficiency of the irradiation of the optical adhesive layers 325 by the ultraviolet rays is lower at the opposite side from the inlet of the ultraviolet rays. A relatively long time is therefore required for the optical adhesive layers 325 to cure. On the other hand, when the reflecting films 332 are formed of multi-layer dielectric film stacks, the ultraviolet rays can be projected from a direction that is not parallel to the surfaces of the transparent members 321, 322 so that the optical adhesive layers 325 can be cured efficiently in a relatively short time.

In the step of FIG. 3(B), the plurality of mutually adhered transparent members 321, 322 are cut along substantially parallel cutting planes (indicated by broken lines in the figure) making a prescribed angle θ with the surfaces thereof, thereby cutting out an optical element block. The value of e is preferably about 45 degrees. A polarization beam splitter array can be obtained by polishing the cut surfaces of the optical element block cut out in this manner.

Figure 4:
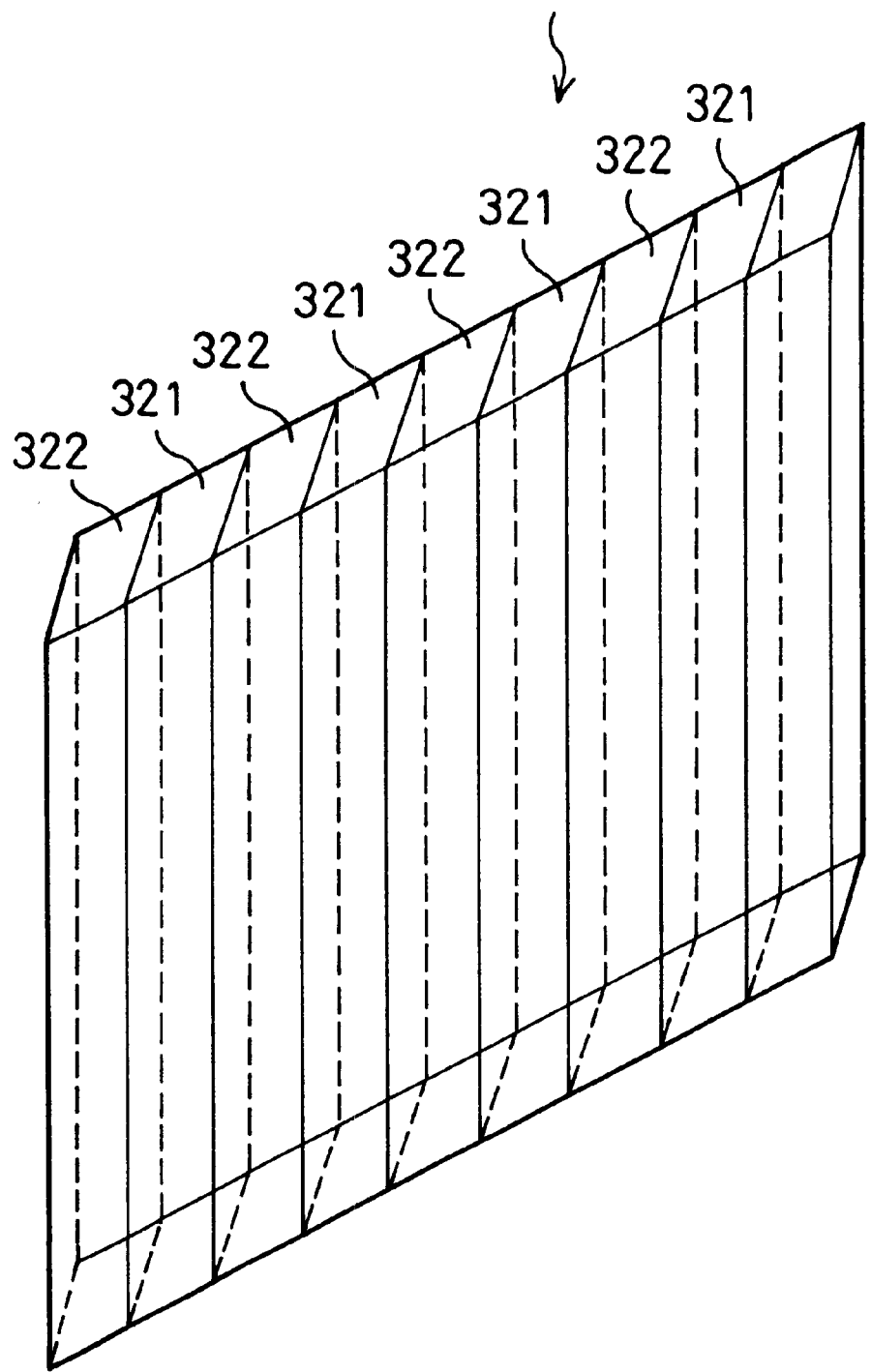
FIG. 4 is a perspective view showing a polarization beam splitter array 320 which is an embodiment of the invention.

FIG. 4 is a perspective view of a polarization beam splitter array 320 produced in this manner. As can be seen in this figure, the polarization beam splitter array 320 has the configuration obtained by alternately joining first and second transparent members 321, 322 having the shape of columns of parallelogram section.

FIG. 5(A) is a plan sectional view showing a polarization converting element obtained by providing λ/2 optical phase plates at selective portions of the exit surface of the polarization beam splitter array 320 of the embodiment. FIG. 5(B) is a plan sectional view showing a polarization converting element which is a control example. In the polarization converting element of the embodiment, the λ/2 optical phase plates 381 are attached on the exit surface of the second transparent members 322. The λ/2 optical phase plates 381 function as polarization direction converting means.

The structure of the control example shown in FIG. 5(B) differs from that of the embodiment of FIG. 5(A) only in the point that the positional relationship between the polarization splitting films 331 and the adjacent optical adhesive layers 325 is reversed. During the fabrication of the polarization beam splitter array 320a shown as a control example, first, the reflecting films 332 are formed on the surfaces of the first transparent members 321 and the polarization splitting films 331 are formed on the surfaces of the second transparent members 322. The transparent members 321, 322 are then alternately adhered by the optical adhesive layers 325.

Light having random polarization directions and including an S polarized light component and a P polarized light component enters from the incident surface of the polarization converting element of the embodiment shown in FIG. 5(A). The incident light is first separated into S polarized light and P polarized light by the polarization splitting film 331. The S polarized light is reflected at substantially a right angle by the polarization splitting film 331, is further reflected by the reflecting film 332, and exits from the exit surface 326. The P polarized light passes straight through the polarization splitting film 331, is converted to S polarized light by the λ/2 optical phase plate 381, and exits therefrom. Therefore, only S polarized light is selectively emitted from the polarization converting element.

If the λ/2 optical phase plates 381 are selectively provided on the exit surface portions of the first transparent members 321, only P polarized light will be selectively emitted from the polarization converting element.

In the polarization beam splitter array 320 according to the embodiment shown in FIG. 5(A), the P polarized light passing through the polarization splitting film 331 passes through an optical adhesive layer 325 once in the path from the incident surface of the polarization beam splitter array 320 to the exit surface thereof. The same is true in the polarization beam splitter array 320a of FIG. 5(B) shown as a control example.

In the embodiment polarization beam splitter array 320, the S polarized light reflected by the polarization splitting film 331 does not pass through an optical adhesive layer 325 in the path from the incident surface of the polarization beam splitter array 320 to the exit surface thereof. In contrast, in the polarization beam splitter array 320a shown as a control example, the S polarized light passes through two optical adhesive layers 325 in the path from the incident surface of the polarization beam splitter array 320a to the exit surface thereof. While the optical adhesive layer 325 is almost completely transparent, it nevertheless absorbs some amount of light. Each time the light passes through an optical adhesive layer 325, therefore, the light quantity decreases. There is also some possibility of the polarization direction changing somewhat during transmission through the optical adhesive layer 325. The light utilization efficiency of the polarization beam splitter array according to the embodiment is higher than that of the control example because the number of passages of the S polarized light through optical adhesive layers 325 is smaller than in the control example.

Figure 1B:
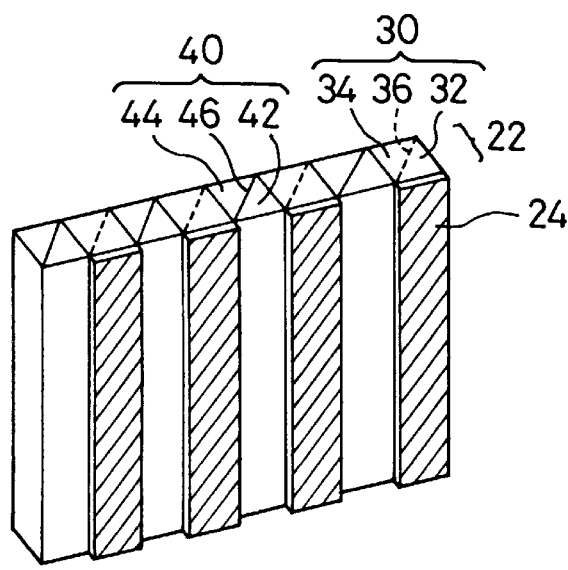

In comparison with the prior-art polarization beam splitter array 22 shown in FIG. 1, however, even the polarization beam splitter array 320a has a relatively high light utilization efficiency because it has fewer optical adhesive layers. The light utilization efficiency of the embodiment shown in FIG. 5(A) adds a further improvement in light utilization efficiency beyond that of the control example.

Figure 10:
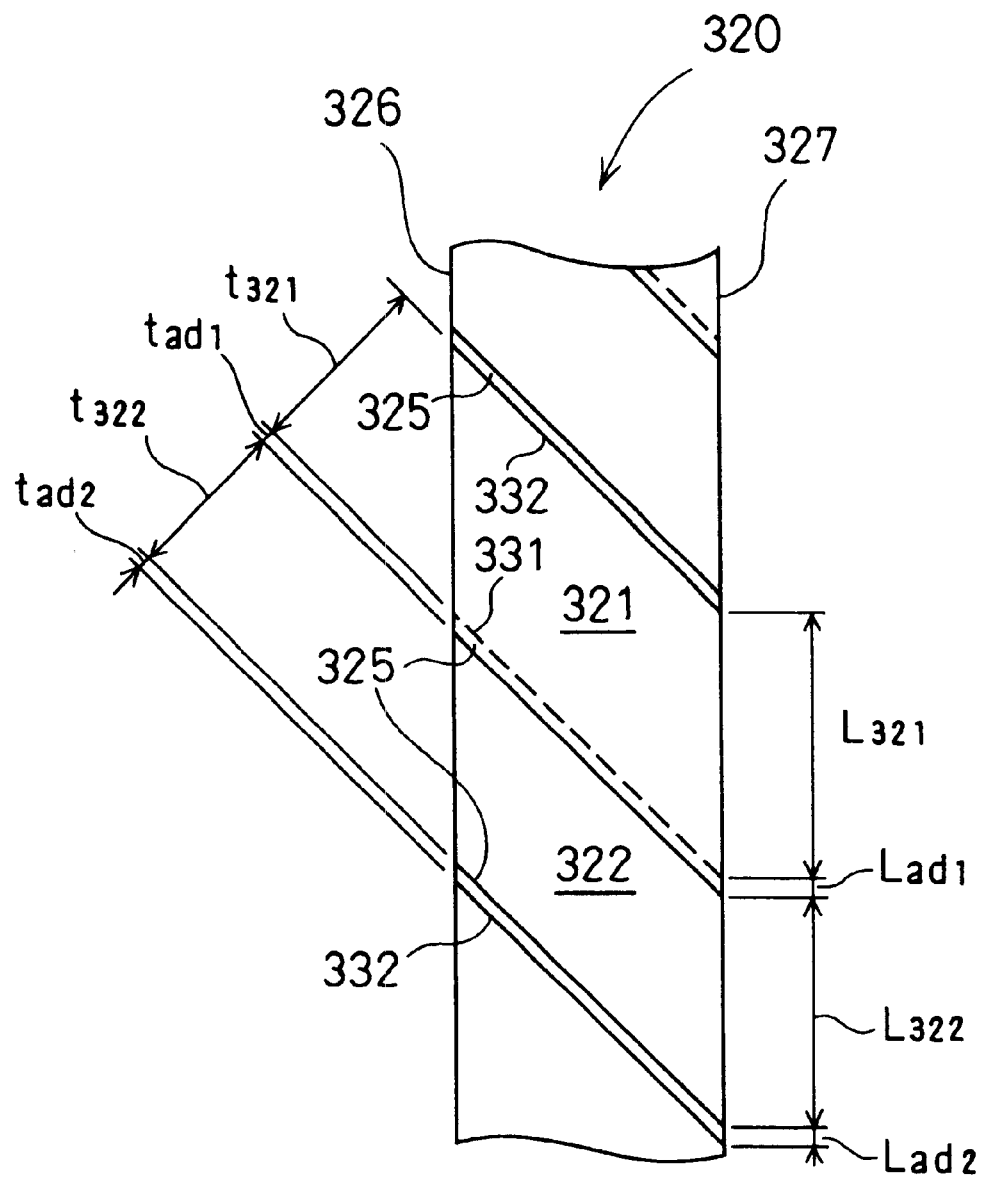
FIG. 10 is an enlarged sectional view showing a polarization beam splitter array 320 which is an embodiment of the invention.

FIG. 10 is an enlarged sectional view showing the polarization beam splitter array 320 according to the embodiment in further detail. The polarization splitting film 331 and the reflecting film 332 have thicknesses of several micrometers ($\mu$m), which are negligible in comparison with the thicknesses $t_{321}$, $t_{322}$ of the transparent members 321, 322 and the thicknesses $t_{ad1}$, $t_{ad2}$ of the optical adhesive layers 325. In FIG. 10, the polarization splitting film 331 is represented by a single broken line and the reflecting film 332 by a single solid line. As was pointed out earlier, the polarization splitting film 331 and the reflecting film 332 are formed on opposite surfaces of the first transparent member 321. The thicknesses $t_{ad1}$, $t_{ad2}$ of the optical adhesive layers 325 may be given different values depending on the layer position. In this embodiment, their values $t_{ad1}$, $t_{ad2}$ are equal throughout the polarization beam splitter array 320. The following explanation assumes that the thicknesses $t_{ad1}$, $t_{ad2}$ of the optical adhesive layers 325 are set at the same value $t_{ad}$.

As shown at the bottom of FIG. 10, the thickness $t_{322}$ of the second transparent member 322 is obtained by subtracting twice the thickness $t_{ad}$ of the optical adhesive layer 325 from the thickness $t_{321}$ of the first transparent member 321. This relationship also holds for thicknesses $L_{321}$, $L_{322}$, $L_{ad}$ when the measurement is made along the exit surface 326 or the incident surface 327 of the polarization beam splitter array 320. Consider, for example, the case where the thickness $t_{321}$ of the first transparent member 321 is 3.17 mm. In this case, since the thickness $t_{ad}$ of the optical adhesive layer 325 is ordinarily in the range of 0.01 to 0.3 mm, the thickness $t_{322}$ of the second transparent member 322 is in the range of 3.15 to 2.57 mm. As in this example, the thickness $t_{322}$ of the second transparent member 322 is preferably set in the range of about 80% to 90% of the thickness $t_{321}$ of the first transparent member 321. To give a specific example, the values can be set at $t_{321}$=3.17 mm, $t_{ad}$=0.06 mm and $t_{322}$=3.05 mm.

By adjusting the thicknesses of the two types of transparent members 321, 322 in advance in this manner, the interval between the polarization splitting film 331 and the reflecting film 332 after adhesion can be made substantially uniform throughout the polarization beam splitter array 320.

In actual practice, fabrication errors may arise in the thicknesses $t_{321}$ and $t_{322}$ of the transparent members 321, 322 and the thickness $t_{ad}$ of the optical adhesive layer 325.

Figure 11:
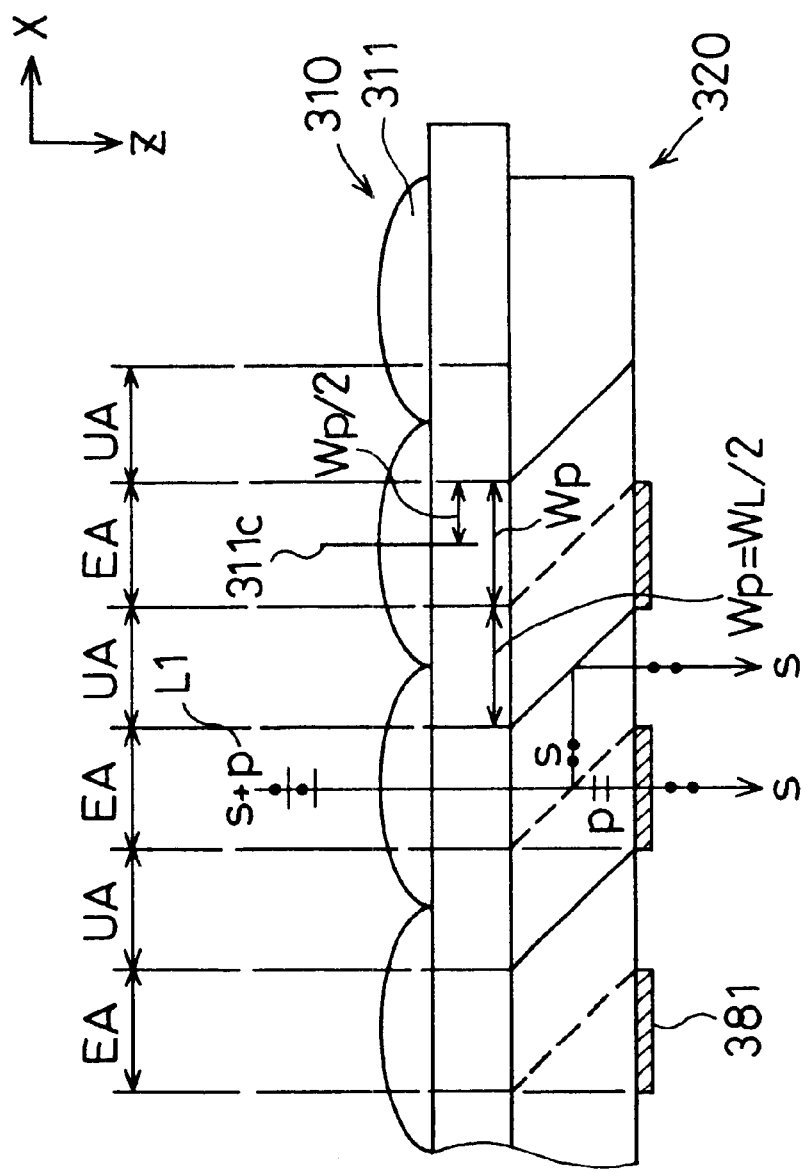
FIG. 11 is a sectional view showing a condenser lens array 310 consisting of a plurality of condenser lenses 311 arranged in a matrix provided on the incident surface side of the polarization beam splitter array 320.

FIG. 11 is a sectional view showing a condenser lens array 310 consisting of a plurality of condenser lenses 311 arranged in a matrix provided on the incident surface side of the polarization beam splitter array 320. The incident surface of the polarization beam splitter array 320 is divided into alternate effective incident areas EA where light is received by the polarization splitting films 331 and converted into effective polarized light (incident areas corresponding to the polarization splitting film 331) and ineffective incident areas UA where light is received by the reflecting films 332 and converted into ineffective polarized light (incident areas corresponding to the reflecting films 332). The x-direction width Wp of the effective incident areas EA and the ineffective incident areas UA is equal to half the x-direction width WL of the lenses 311. The centers (optical axes) 311c of the lenses 311 are disposed to coincide with the centers of the effective incident areas EA in the x direction. The effective incident areas EA correspond to the regions of the polarization splitting films 331 projected onto the incident surface of the polarization beam splitter array 320. The pitch of the polarization splitting films 331 in the x direction is thus set to be the same as the pitch of the centers 311c of the lenses 311 in the x direction.

The lens 311 at the far right in FIG. 11 is not formed with an associated polarization splitting film 331 or reflecting film 332. This is because the absence of these films has little effect on the light utilization efficiency since the light quantity passing through the lens 311 at the end portion is relatively small.

FIGS. 12(a)–12(c) are explanatory diagrams showing the case where the pitch of the polarization splitting films 331 is set to a different value from the pitch of the centers 311c of the lenses 311 and where two polarizing light beam splitters 320' are symmetrically disposed on opposite sides of the system optical axis L so that their polarization splitting films 331 and reflecting films 332 face each other. The portion to the left of the system optical axis is not shown in the drawing.

The quantity distribution of the light collected by the lenses La–Ld of the condenser lens array 310 and received by the incident surface of the polarizing light beam splitter 320' is shown at the middle row in FIG. 12. Generally, the intensity Ia of the light collected by the lens La which is closest to the system optical axis (the center of the polarizing light beam splitters 320') is strongest and the intensities of the light collected by the other lenses are weaker with increasing distance of the lens from the system optical axis. In FIG. 12, the intensity Id of light collected by the fourth lens Ld is weakest. The light quantity distribution of a specific lens (the third lens Lc in FIG. 12) is symmetric relative to the lens center, and the light quantity distribution of the other lenses is offset from the lens center toward or away from the system optical axis depending on whether they are less or more distance from the system optical axis than the specific lens. In FIG. 12, the light quantity distribution Pc of the lens Lc is substantially symmetrical relative to the lens center, while the light quantity distributions Pb, Pa of the lenses Lb and La are progressively offset toward the system optical axis with increasing proximity of the lens to the system optical axis. The light quantity distribution Pd of the lens Ld is offset away from the system optical axis. In this case, if the centers of the effective incident areas EA of the polarizing light beam splitters 320' are indiscriminately aligned with the optical axes (centers) of the lenses, light loss occurs owing to the offsetting of the light quantity distributions. The offset between the light quantity distribution of light exiting from the lens array and the effective incident area EA results in a particularly large loss of light near the optical axis of the light source. The centers of the effective incident areas EA of the polarizing light beam splitters 320' are therefore preferably arranged in accordance with the distribution of the light exiting from the condenser lens array 310, i.e., in accordance with the intervals between the light quantity distribution peaks of the light exiting from the condenser lens array 310. In other words, the thicknesses $t_{321}$, $t_{322}$ of the transparent members 321, 322 and the thickness $t_{ad}$ of the optical adhesive layers 325 (FIG. 10) are preferably adjusted to align the spacing of the polarization splitting films 331 with the spacing of the light quantity distribution peaks.

In order to effectively utilize the light collected by the condenser lens array 310, an arrangement is preferably adopted where the utilization of the light collected by a lens increases as the lens comes closer to the system optical axis. In particular, since the light quantity is large near the optical axis of the light source and the distribution Pa of the light exiting from the lens La located near the optical axis of the light source is offset from the center (optical axis) of the lens toward the optical axis of the light source, the center of the effective incident area EA1 of the polarizing light beam splitter 320' nearest the optical axis of the light source is preferably aligned substantially with the peak of the light distribution Pa.

In the configuration shown in FIGS. 12(a)–12(c), the width of the effective incident areas EA1–EA4 and the ineffective incident areas UA1–UA4 (i.e., the intervals between the polarization splitting films 331) is matched to the intensity distribution or quantity distribution of the light exiting from the condenser lenses 311 of the condenser lens array 310. Specifically, the x-direction width Wp' of the effective incident areas EA (EA1–EA4 in FIG. 12(c)) and the ineffective incident areas UA (UA1–UA4 in FIG. 12(c)) of the polarizing light beam splitter 320' is larger than half the x direction width WL of the lenses La–Ld of the condenser lens array 310.

In the example of FIGS. 12(a)–12(c), the polarizing light beam splitter 320' is positioned so that the center of the third lens Lc is aligned with the center of the corresponding effective incident area EA3. Since the width of the ineffective incident areas UA is ordinarily equal to the width Wp' of the effective incident areas EA, the two effective incident areas EA2, EA1 on the left side are progressively offset toward the system optical axis relative to the centers of the lenses Lb, La. The center of the rightmost effective incident area EA4 is offset away from the system optical axis relative to the center of the lens Ld. The effective incident areas EA1–EA4 are therefore substantially aligned with the peaks of the light quantity distribution of the light exiting from the condenser lens array 310. The effective incident areas associated with a prescribed number of lenses, e.g., two or three lenses, near the system optical axis, where the light intensity is particularly high, are preferably aligned substantially with the light quantity distributions of the light collected by these lenses. Use of this arrangement increases the light utilization efficiency. The degree to which the width of the effective incident areas EA should be made larger than half the lens width and the selection of the lens whose associated effective incidence area is to be used as the reference for the layout can be easily determined empirically from the number of lenses of the lens array and the light distribution associated with the individual lenses. The width of the effective and ineffective incidence areas is not limited to larger than half the lens width. It can be otherwise decided based on the actual quantity distribution of the light received by the incident surface of the polarizing light beam splitter 320'.

Figure 13A:
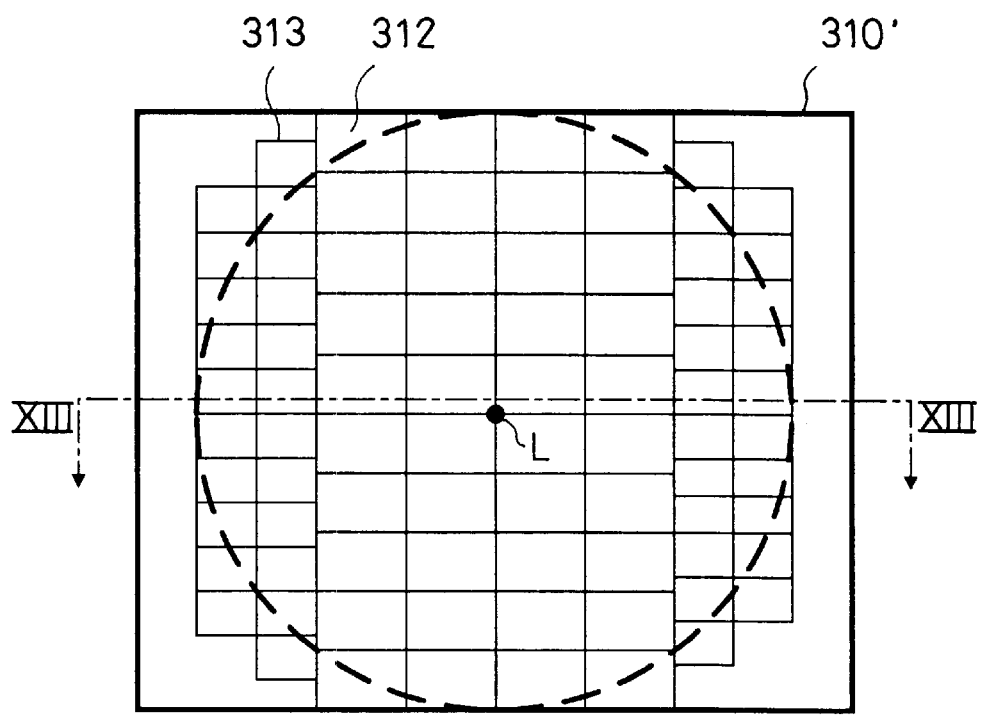
FIG. 13(A) is a plan view showing a condenser lens array 310' having plural types of small lenses differing in size.
Figure 13B:
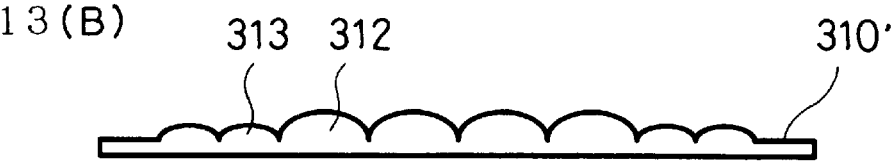
FIG. 13(B) is a sectional view along B—B in the plan view.

Although the examples of FIGS. 11 and 12(a)–12(c) set out above assume that the small lenses 311 of the condenser lens array 310 are all of the same size, they may instead be varied in size depending on location. FIG. 13(A) is a plan view showing a condenser lens array 310' having plural types of small lenses differing in size and FIG. 13(B) is sectional taken along line B—B in FIG. 13(A). The broken-line circle in FIG. 13(A) designates a region where the quantity of light from the light source is relatively large.

The condenser lens array 310' has first small lenses 312 of relatively large size arranged in a matrix around the system optical axis L and second small lenses 313 of relatively small size arranged in an approximately matrix configuration near edges of the condenser lens array 310'. When a configuration and effect similar to those of the condenser lens array 310 of FIG. 11 are to be achieved with such a condenser lens array 310', at least some among the thicknesses $t_{321}$, $t_{322}$ of the transparent members 321, 322 and the thickness $t_{ad}$ of the optical adhesive layers 325 (FIG. 10) are adjusted so as to align the centers of the effective incidence areas of the polarization beam splitter array (i.e., the pitch of the polarization splitting films) with the pitches of the associated small lenses 312, 313. Otherwise, when a configuration and effect similar to those of the polarizing light beam splitter 320' of FIGS. 12(a)–12(c) is to be achieved, at least some among the thicknesses $t_{321}$, $t_{322}$ of the transparent members 321, 322 and the thickness $t_{ad}$ of the optical adhesive layers 325 are adjusted so as to align the centers of the effective incidence areas of the polarization beam splitter array (i.e., the pitch of the polarization splitting films) with the pitches of the light quantity distributions of the beams exiting from the associated small lenses 312, 313.

B. Second embodiment

Figure 14:
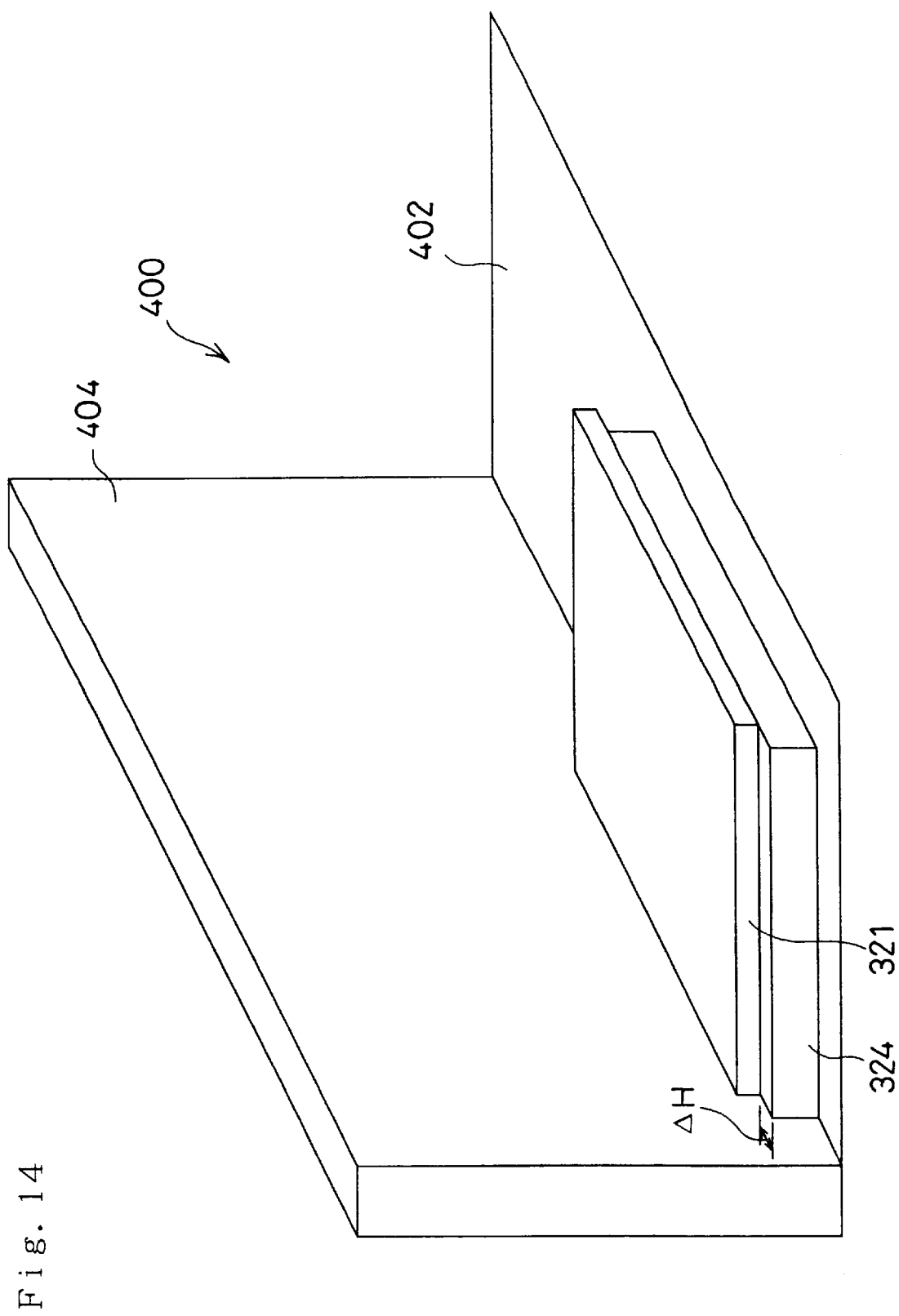
FIG. 14 illustrates a step in fabrication of a polarization beam splitter array according to a second embodiment.

FIGS. 14 to 19 are explanatory diagrams showing a method for fabricating a polarization beam splitter array according to a second embodiment. As shown in FIG. 14, the second embodiment uses a horizontal table 402 and a vertical wall 404 standing on the horizontal table 402.

In the second embodiment, as in the first embodiment, the first transparent members 321 (glass plates with films) and the second transparent members 322 (glass plates without films) shown in FIG. 2(A) are prepared. The dummy glass plate 324 shown in FIG. 14 is also made ready. The dummy glass plate 324 is a flat plate of glass which is not provided with a polarization splitting film or a reflecting film. The dummy glass plate 324 constitutes an end of the polarization beam splitter. The thickness of the dummy glass plate 324 may be set different from those of the first and second transparent members 321, 322.

Figure 15:
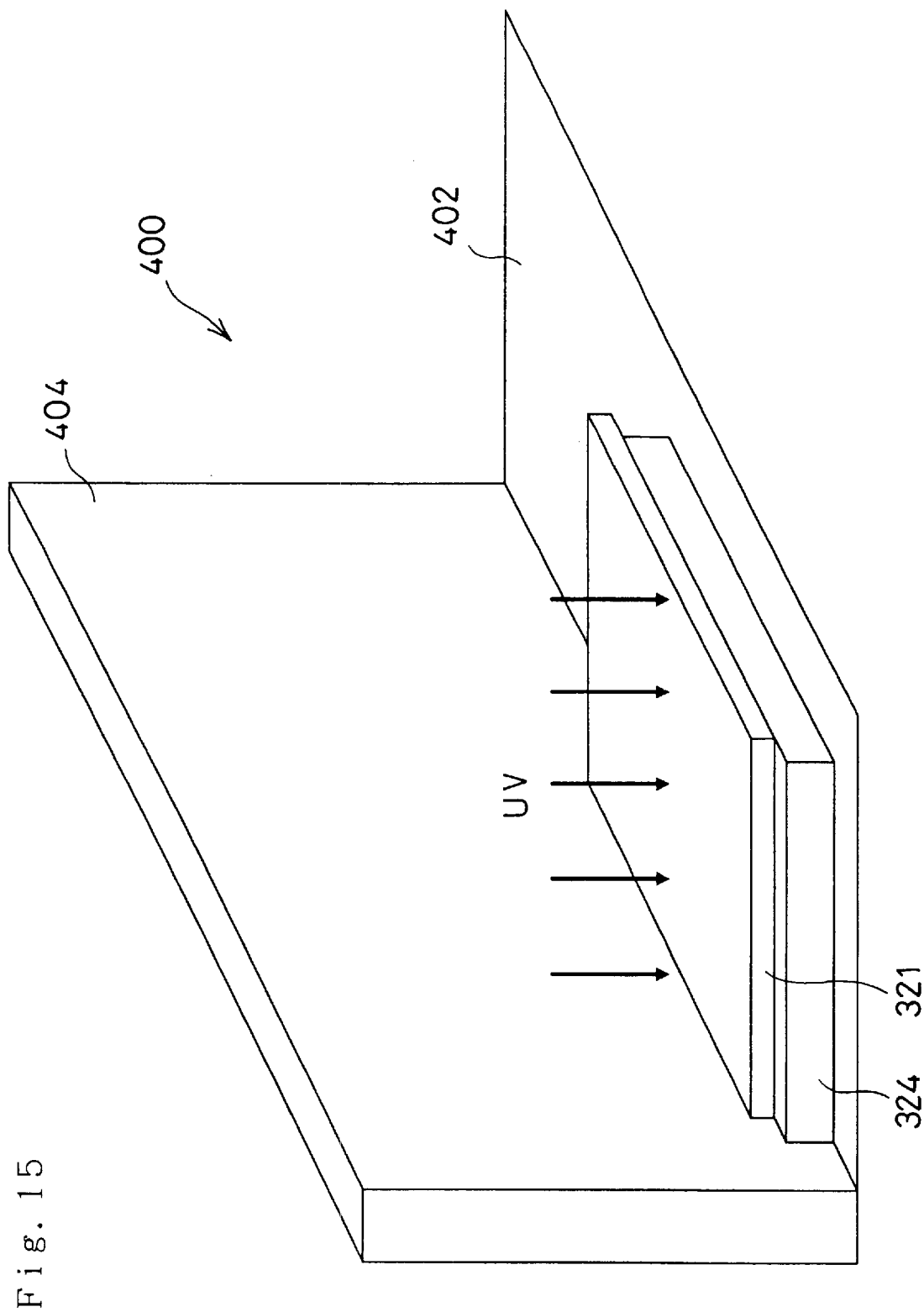
FIG. 15 illustrates another step in fabrication of a polarization beam splitter array according to the second embodiment.

The state of FIG. 14 is obtained by first placing the dummy glass plate 324 on the horizontal table 402 and coating its upper surface with a photo-curing adhesive, then placing the first transparent member 321 on the dummy glass plate 324. The dummy glass plate 324 and the first transparent member 321 stacked with the adhesive layer therebetween are rubbed together to drive air bubbles out of the adhesive layer and even the thickness of the adhesive layer. In this state, the dummy glass plate 324 and the first transparent member 321 adhere to each other owing to surface tension. As shown in FIG. 14, the dummy glass plate 324 and the first transparent member 321 abut on the vertical wall 404. At this time, the dummy glass plate 324 and the first transparent member 321 are offset by a prescribed offset distance Δ H at the surfaces perpendicular to the abutting surfaces. As shown in FIG. 15, ultraviolet rays (UV in the figure) are projected onto the first transparent member 321 from above to cure the adhesive. The plate members adhered in this manner are called the "first stack." The ultraviolet rays are preferably projected from a direction that is not parallel to the surface of the first transparent member 321. The adhesive can be efficiently irradiated by ultraviolet rays projected in this manner, thereby shortening the adhesive curing time and improving the optical element production throughput.

Figure 16:
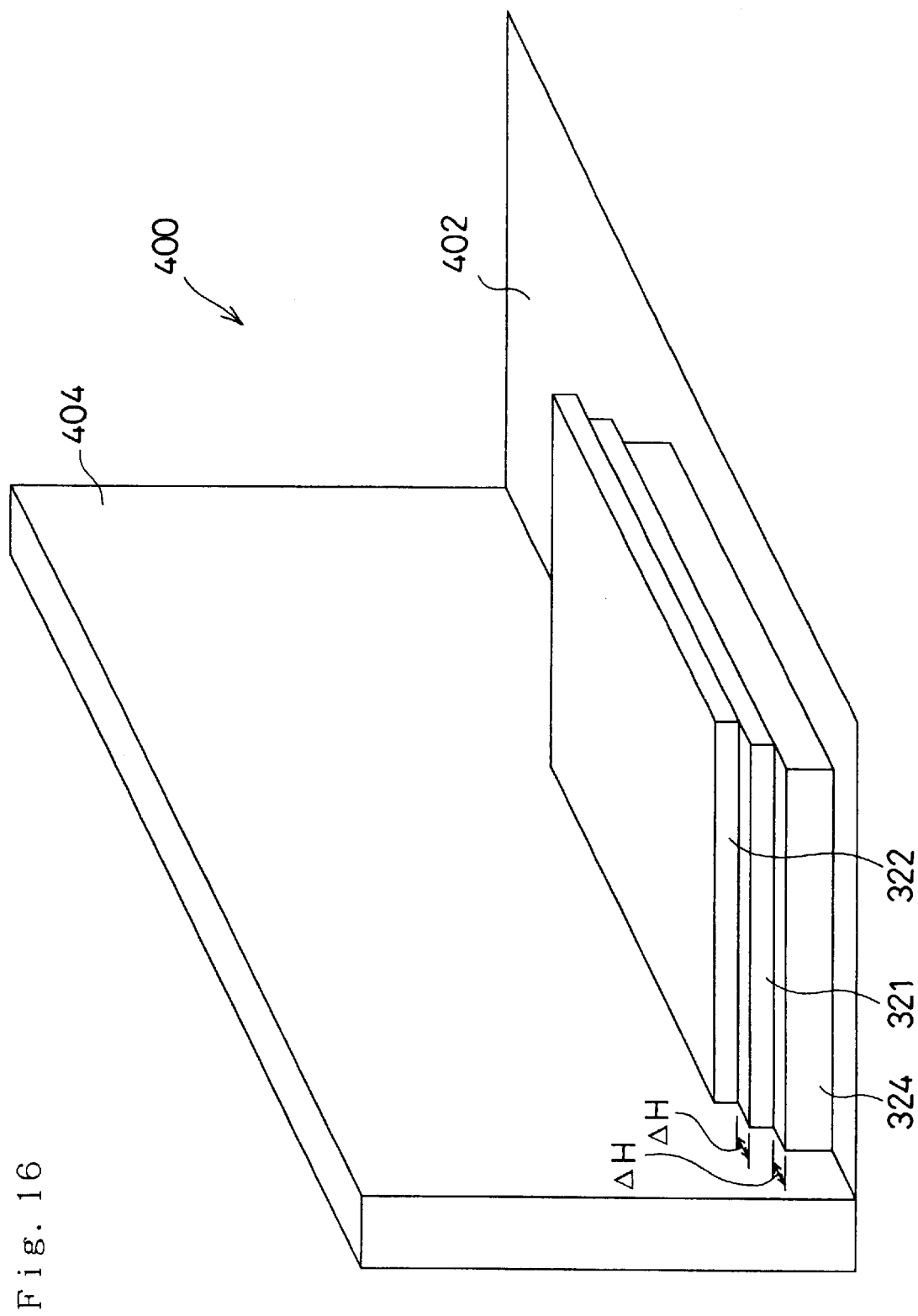
FIG. 16 illustrates still another step in fabrication of a polarization beam splitter array according to the second embodiment.
Figure 17:
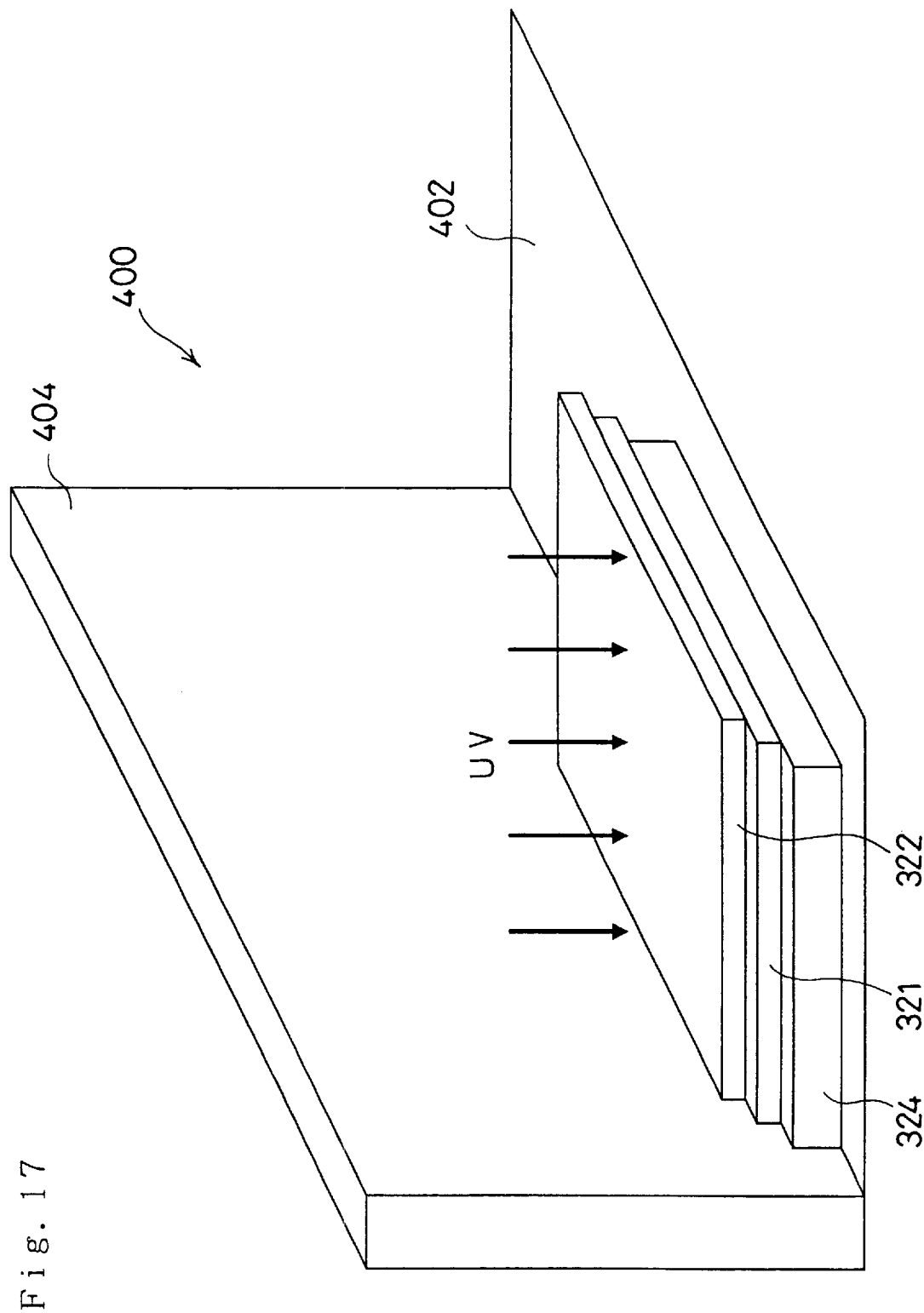
FIG. 17 illustrates another step in fabrication of a polarization beam splitter array according to the second embodiment.

The upper surface of the first stack is coated with adhesive and the second transparent member 322 is placed thereon (FIG. 16). The first and second transparent members 321, 322 stacked with the adhesive layer therebetween are rubbed together to drive air bubbles out of the adhesive layer and even the thickness of the adhesive layer. The first transparent member 321 and the second transparent member 322 are offset by the prescribed offset distance Δ H. As shown in FIG. 17, ultraviolet rays are projected onto the second transparent member 322 from above to cure the adhesive. A second stack is thus obtained.

Figure 18:
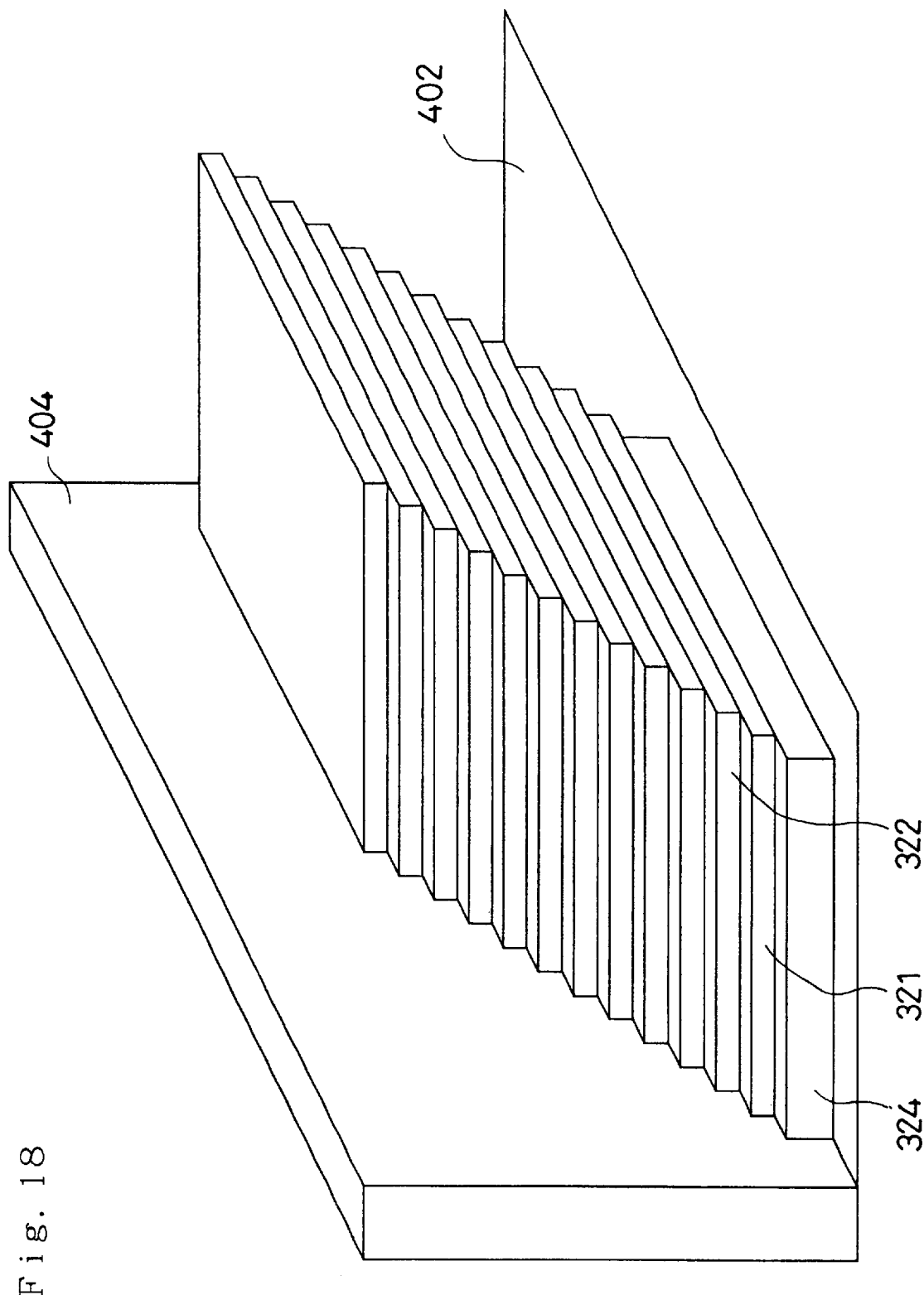
FIG. 18 illustrates another step in fabrication of a polarization beam splitter array according to the second embodiment.
Figure 19:
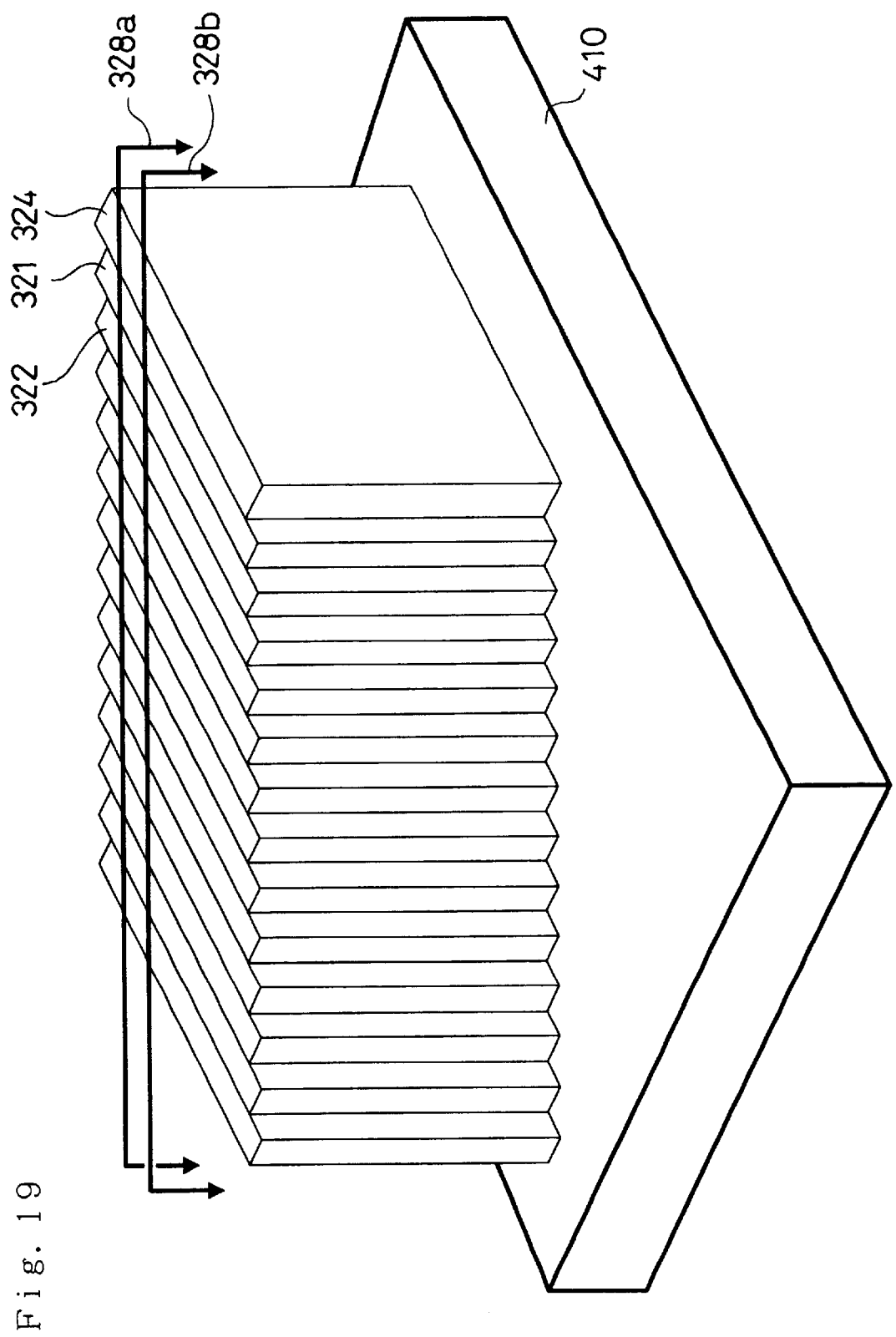
FIG. 19 illustrates still another step in fabrication of a polarization beam splitter array according to the second embodiment.

The aforesaid process of applying an adhesive layer, overlaying a transparent member and projecting ultraviolet rays thereon to cure the adhesive layer is then repeated to obtain the stack shown in FIG. 18. This stack is then cut as shown in FIG. 19. The cutting is conducted with the side of the stack shown in abutment with the vertical wall 404 in FIG. 18 facing downward and resting on a cutting table 410. It is cut along parallel cutting lines 328a, 328b. An element similar to the polarization beam splitter array of the first embodiment shown in FIG. 4 is then obtained by polishing the cut surfaces until flat. The polarization beam splitter array according to the second embodiment is different, however, in that it has the dummy glass plate 324 at the end thereof.

In the second embodiment, since adhesive layers are cured by irradiation with ultraviolet rays each time another transparent member is added to the stack after application of a new adhesive layer, the positional relationship among the transparent members is defined with good accuracy. Moreover, since each irradiation is required to cure only a single adhesive layer, the curing can be conducted with high reliability. The polarization beam splitter array of the first embodiment can also be assembled by the assembly method of the second embodiment.

It is also possible to prepare a number of unit stacks each obtained by bonding together a single first transparent member 321 and a single second transparent member 322 in the manner of the second embodiment and then successively laminating the unit stacks. Specifically, one unit stack can be laminated to sandwich an adhesive layer, the air bubbles be driven out of the adhesive layer, and the adhesive layer then be cured by irradiation with ultraviolet rays. These steps provide substantially the same effects as mentioned above.

In either of the first and second embodiments, the thickness precision of the transparent members 321, 322 can be controlled at the time of polishing their surfaces. Adhesive layers of uniform thickness can be obtained by applying the adhesive to a uniform coating weight throughout the member surfaces and applying pressure evenly to the member surface in the step of driving out air bubbles.

C. Polarized light illumination system and image display system

FIG. 6 is a schematic structural plan view of the essential portion of a polarized light illumination system 1 including a polarization beam splitter array which is an embodiment of this invention described in the foregoing. The polarized light illumination system 1 is equipped with a light source section 10 and a polarized light generator 20. The light source section 10 emits a light beam having random polarization directions and including an S polarized light component and a P polarized light component. The light beam emitted by the light source section 10 is converted to a single type of linearly polarized light generally aligned in one polarization direction by the polarized light generator 20. The linearly polarized light from the polarized light generator 20 illuminates an illumination area 90.

The light source section 10 comprises a lamp 101 and a parabolic reflector 102. The light emitted by the lamp 101 is reflected in one direction by the parabolic reflector 102 and passes to the polarized light generator 20 as a generally parallel beam. The optical axis R of the light source section 10 is shifted parallel to the system optical axis L in the x direction by a given distance D. The system optical axis L is the optical axis of a polarization beam splitter array 320. The reason for shifting the light source optical axis R will be described later.

Figure 7:
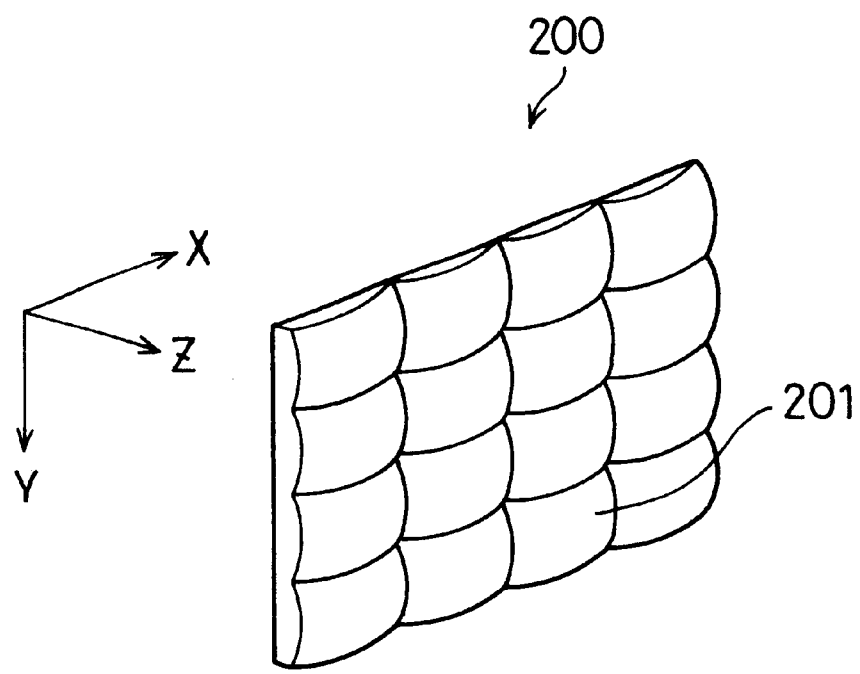
FIG. 7 is a perspective view showing a first optical element 200.

The polarized light generator 20 comprises a first optical element 200 and a second optical element 300. FIG. 7 is a perspective view of the first optical element 200. As shown in FIG. 7, the first optical element 200 is made of a plurality of small beam dividing lenses 201 of rectangular profile arrayed vertically and horizontally in the form of a square matrix. The first optical element 200 is disposed so that the light source optical axis R (FIG. 6) is aligned with the center of the first optical element 200. The profiles of the individual beam dividing lenses 201 as viewed in the z direction are made similar to that of the illumination area 90. Since this embodiment assumes an illumination area 90 that is long in the x direction, the beam dividing lenses 201 also have an xy surface that is long in the lateral (x) direction.

The second optical element 300 in FIG. 6 comprises a condenser lens array 310, a polarization beam splitter array 320, a selective phase plate 380 and an exit side lens 390. The selective phase plate 380 is a platelike member including λ/2 optical phase plates 381 which, as explained with reference to FIG. 5, are formed only at the exit surface portions of the second transparent member 322, and the other parts of the selective phase plate 380 located at the exit surface portions of the first transparent member 32 is colorless and transparent. The polarization beam splitter array shown in FIG. 6 has the approximate shape of a rectangular parallelopiped obtained by cutting off the projecting portions at the opposite edges of the structure shown in FIG. 4.

The condenser lens array 310 is of substantially the same structure as the first optical element 200 shown in FIG. 7. Specifically, the condenser lens array 310 is made of a matrix of condenser lenses 311 in a number equal to the number of beam dividing lenses 201 of the first optical element 200. The center of the condenser lens array 310 is also aligned with the light source optical axis R.

The light source section 10 emits a substantially parallel beam of white light having random polarization directions. The light beam emitted by the light source section 10 and entering the first optical element 200 is divided into intermediate beams 202 by the beam dividing lenses 201. The condensing action of the beam dividing lenses 201 and the condenser lenses 311 converges the intermediate beams 202 in the plane perpendicular to the system optical axis L (the xy plane in FIG. 6). Light source images are formed in a number equal to the number of beam dividing lenses 201 at the positions where the intermediate beams 202 converge. The light source images are formed at positions near the polarization splitting films 331 in the polarization beam splitter array 320.

The offsetting of the light source optical axis R from the system optical axis L is intended to enable formation of light source images at the positions of the polarization splitting films 331. The offset distance D is set at half the x-direction width Wp (FIG. 6) of the polarization splitting film 331. As mentioned earlier, the center of the light source section 10, the first optical element 200 and the condenser lens array 310 are aligned on the light source optical axis R and are offset from the system optical axis L by D=Wp/2. On the other hand, as can be seen from FIG. 6, the centers of the polarization splitting films 331 for splitting the intermediate beams 202 are also offset by Wp/2 relative to the system optical axis L. The offsetting of the light source optical axis R from the system optical axis L by Wp/2 therefore enables light source images (images of the lamp 101) to be formed substantially at the centers of the polarization splitting films 331.

As shown in FIG. 5(A) discussed earlier, the beams entering the polarization beam splitter array 320 are entirely converted to S polarized light. The beams exiting the polarization beam splitter array 320 pass through the exit side lens 390 and illuminate the illumination area 90. Since the illumination area 90 is illuminated by a large number of beams produced by the beam dividing lenses 201, it is evenly illuminated throughout.

When the parallelism of the light beam entering the first optical element 200 is extremely good, the condenser lens array 310 can be omitted from the second optical element 300.

As explained in the foregoing, the polarized light illumination system 1 shown in FIG. 6 functions as a polarized light generator capable of converting a beam of white light having random polarization directions into a light beam having a specific polarization direction (S polarized light or P polarized light) and further functions as an illuminator capable of evenly illuminating the illumination area 90 with a large number of polarized light beams. Since the polarized light illumination system 1 uses the polarization beam splitter array 320, which is an embodiment of this invention, it provides higher light utilization efficiency than achievable by the prior art.

FIG. 8 is a schematic structural view showing the essential portion of a projection display system 800 equipped with the polarized light illumination system 1 shown in FIG. 6. The projection display system 800 comprises the polarized light illumination system 1, dichroic mirrors 801, 804, reflecting mirrors 802, 807, 809, relay lenses 806, 808, 810, three liquid crystal panels (liquid crystal light valves) 803, 805, 811, a cross dichroic prism 813 and a projection lens 814.

The dichroic mirrors 801, 804 function as color separating means for separating a white light beam into three colors: red, blue and green. The three liquid crystal panels 803, 805, 811 function as light modulating means for forming images by modulating the light of each of the three colors according to supplied image information (image signals). The cross dichroic prism 813 functions as a color combining means for combining the red, blue and green light to form a color image. The projection lens 814 functions as a projection optical system for projecting the light representing the combined image on a screen 815.

The blue- and green-reflecting dichroic mirror 801 transmits the red light component of the white light beam emitted from the polarized light illumination system 1 and reflects the blue light component and the green light component thereof. The transmitted red light is reflected by the reflecting mirror 802 and passes to the red liquid crystal panel 803. The green light reflected by the first dichroic mirror 801 is reflected by the green-reflecting dichroic mirror 804 and passes to the green liquid crystal panel 805. The blue light reflected by the first dichroic mirror 801 passes through the second dichroic mirror 804.

In this embodiment, the optical path length of the blue light is longest among the three colors. After the blue light has passed through the dichroic mirror 804, it enters a light guide means 850 including an entrance lens 806, a relay lens 808 and an exit lens 810. Specifically, the blue light transmitted through the dichroic mirror 804 passes through the entrance lens 806, is reflected by the reflecting mirror 807 and passes to the relay lens 808. It is then reflected by the reflecting mirror 809, through the exit lens 810 and to the blue liquid crystal panel 811. The three liquid crystal panels 803, 805 and 811 correspond to the illumination area 90 in FIG. 6.

The three liquid crystal panels 803, 805, 811 modulate the light of each color in accordance with an image signal (image information) supplied from external control circuits (not shown) to produce colored light carrying image information of the color component concerned. The modulated red, blue and green lights enter the cross dichroic prism 813. The cross dichroic prism 813 is formed with multi-layer dielectric film stacks which reflect red light and multi-layer dielectric film stacks which reflect blue light arranged in the form of a cross. The three colors are merged by these multi-layer dielectric film stacks into light carrying a color image. The merged light is projected on the screen 815 by the projection lens 814 constituting the projection system to display an enlarged image.

The liquid crystal panels 803, 805, 811 used as light modulating means in the projection display system 800 are of the type which modulate light beams of a specific polarization direction (S polarized light or P polarized light). These liquid crystal display panels ordinarily have polarizing plates (not shown) attached to their incident and exit surfaces. When such a liquid crystal display panel is illuminated with a light beam having random polarization directions, therefore, about half of the light beam will be absorbed by the polarizing plates and changed to heat. The light utilization efficiency will be therefore low. In addition, the polarizing plates will generate much heat, which will also cause problems. In the projection display system 800 shown in FIG. 8, however, the polarized light illumination system 1 generates light beams of the specific polarization direction for passage through the liquid crystal panels 803, 805, 811. The problem of absorption of light and generation of heat at the polarizing plates of the liquid crystal display panels is therefore greatly alleviated. Moreover, since the projection display system 800 uses the polarization beam splitter array 320, which is an embodiment of the invention, it also enjoys a corresponding improvement in overall light utilization efficiency.

The reflecting films 332 of the polarization beam splitter array 320 are preferably formed as multi-layer dielectric film stacks with the property of selectively reflecting only the specific polarized light component (e.g. S polarized light) to be modulated by the liquid crystal panels 803, 805, 811. This is advantageous because it further mitigates the problem of light absorption and heat generation at the liquid crystal panels 803, 805, 811. This in turn enhances the overall light utilization efficiency of the projection display system 800.

As explained in the foregoing, by using the polarization beam splitter array which is an embodiment of the invention, the projection display system can achieve an improvement in light utilization efficiency over the prior art. The images projected on the screen 815 are therefore brighter.

The present invention is in no way limited to the details of the embodiments and examples described in the foregoing but various changes and modifications may be made without departing from the essential scope thereof. For example, the modifications listed below are possible.

The polarization beam splitter array of the invention can also be applied to various systems and devices other than the projection display system shown in FIG. 8. For instance, the polarization beam splitter array can be applied to a projection display system for projecting monochrome images instead of color images. In this case, the system of FIG. 8 requires only a single liquid crystal display panel, while the color separating means for three-color separation and the color synthesizing means for synthesizing light of three colors can be omitted.

Figure 9A:
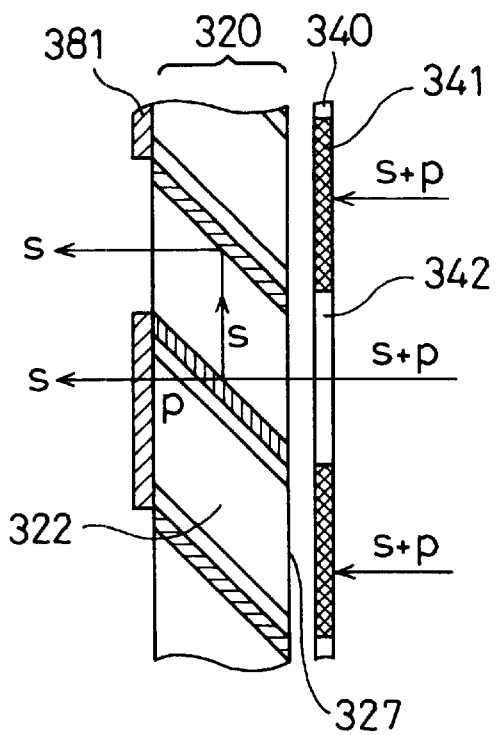
FIGS. 9(A) and 9(B) are explanatory views showing the structure of an optical element having a light shield plate 340.

In the embodiment shown in FIG. 5, a light shielding means can be provided to prevent entry of light from the incident surface of the second transparent members. FIG. 9(A) is an explanatory diagram showing how a light shielding plate 340 is provided in front of the optical element according to the embodiment of FIG. 5(A). The light shielding plate 340 alternately includes light shielding portions 341 for shutting out light and transparent portions 342 for passing light. The light shielding plate 340 can be fabricated by, for example, forming light absorbing films or light reflecting films as the light shielding portions 341 on the surface of a glass plate or other transparent plate member. The light shielding portions 341 are provided in association with the incident surface 327 of the second transparent members 322 so as to shield the incident surface 327.

Figure 9B:
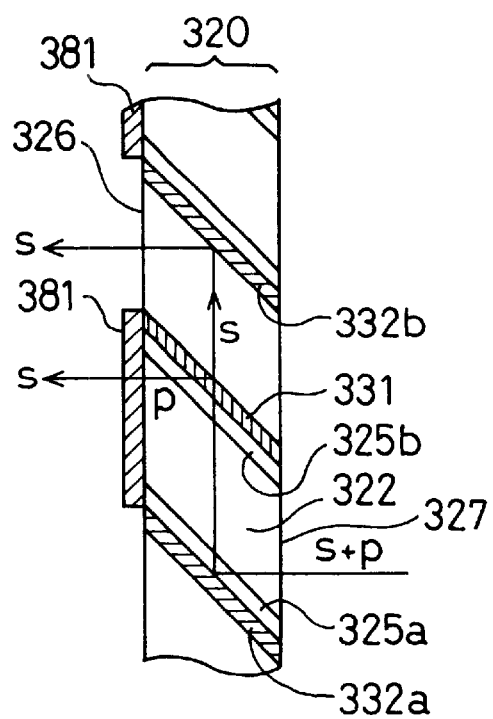

FIG. 9(B) shows the optical path of the light entering from the incident surface 327 of the second transparent member 322 when the light shielding plate 340 is not provided. The light entering from the incident surface 327 is reflected by the reflecting film 322a and is then split into S polarized light and P polarized light by the polarization splitting film 331 thereabove. The P polarized light is converted into S polarized light by the λ/2 optical phase plate 381. The S polarized light is reflected by the reflecting film 332b above the polarization splitting film 331 and exits through the exit surface 326. As can be seen from FIG. 9(B), the S polarized light component of the light entering through the incident surface 327 passes through the first optical adhesive layer 325a twice and then through the optical adhesive layer 325b once before reaching the reflecting film 332b above. On the other hand, the P polarized light component passes through the optical adhesive layer 325a twice and the optical adhesive layer 325b twice before reaching the λ/2 optical phase plate 381. When the light shielding plate 340 is not provided, therefore, the light entering through the incident surface 327 of the second transparent member 322 passes repeatedly through optical adhesive layers 325. This light can be shut out by providing the light shielding plate 340 as shown in FIG. 9(A).

Instead of providing the light shielding plate 340 separately of the polarization beam splitter array 320, it is possible to provide light shielding portions 341 formed as aluminum reflecting films or the like on the incident surface 327 of the second transparent member 322.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical element comprising:

a plurality of first transparent members each having a first incident surface and a first exit surface substantially parallel to each other, first and second film forming surfaces substantially parallel to each other and making a prescribed angle with said first incident surface and said first exit surface, a polarization splitting film formed on said first film forming surface, without adhesive material therebetween and a reflecting film formed on said second film forming surface without adhesive material therebetween, and a thickness;

a plurality of second transparent members each having a second incident surface and a second exit surface parallel to each other, said plurality of second transparent members being alternately arranged with and secured to said plurality of first transparent members at said first and second film forming surfaces across said polarization splitting film and said reflecting film respectively so that said second incident surfaces are aligned with said first incident surfaces to form an incident plane and that said second exit surfaces are aligned with said first exit surfaces to form an exit plane; and adhesive layers between said second transparent members and said polarization splitting films and between said second transparent members and said reflecting films, respectively, and wherein at least one of a thickness of the adhesive layers and thicknesses of said first and second transparent members are adjusted to make intervals between said polarization splitting films and said reflecting films substantially constant throughout the optical element;

whereby incident light entering through the first incident surface of each first transparent member is directed upon and split by the associated polarization splitting film into first and second components, the first component being directed towards and reflected by the associated reflecting film towards the associated first exit surface without passing through any adhesive layers, and the second component passing through the associated polarization splitting film and out the second exit surface of an immediately adjacent second transparent member while passing through only one of the adhesive layers.

2. An optical element according to claim 1, wherein said reflecting film is a dielectric multi-layer film.

3. An optical element according to claim 1, further comprising polarization direction converting means associated with either of said first exit surface and said second exit surface.

4. An optical element according to claim 1, further comprising light shielding means associated with said second incident surface.

5. An optical element according to claim 1 wherein the thickness of the second transparent members is set smaller than the thickness of said first transparent members.

6. An optical element according to claim 5 wherein the thickness of said second transparent members is in the range of 80% to 90% of the thickness of said first transparent members.

7. An optical element according to claim 1,
wherein the thickness of said first transparent members is equal to a value obtained by adding twice the thickness of said adhesive layers to the thickness of said second transparent members.

8. An optical element according to claim 1, wherein
said optical element is to be used with a plurality of small lenses which will be arranged on said incident plane, and
the intervals between the plurality of polarization splitting films substantially correspond to a pitch of the plurality of small lenses.

9. An optical element according to claim 8,
wherein at least one of a thickness of the adhesive layers and thicknesses of said first and second transparent members are adjusted to make the intervals between said plurality of polarization splitting films substantially correspond to a pitch of an optical axes of the plurality of small lenses.

10. An optical element according to claim 9, wherein
the plurality of small lenses have a plurality of different optical axis pitches, and
at least one of the thickness of the adhesive layers and the thicknesses of said first and second transparent members are adjusted to make the intervals between said plurality of polarization splitting films substantially correspond to the plurality of different optical axis pitches.

11. An optical element according to claim 1, wherein
said optical element is to be used with a plurality of small lenses which will be arranged on said incident plane, and
the intervals between the plurality of polarization splitting films substantially correspond to a pitch of a plurality of light beams exiting from the plurality of small lenses.

12. An optical element according to claim 11, wherein at least one of the thickness of the adhesive layers and the thicknesses of said first and second transparent members are adjusted to make the intervals between said plurality of polarization splitting films substantially correspond to the pitch of the plurality of light beams exiting from the plurality of small lenses.

* * * * *